US012807261B2

(12) United States Patent
Sakohata et al.

(10) Patent No.: US 12,807,261 B2
(45) Date of Patent: Nov. 24, 2026

(54) SENSOR UNIT OF HUMAN-POWERED VEHICLE, ROTARY DEVICE, AND TORQUE SENSING METHOD

(71) Applicant: SHIMANO INC., Sakai City (JP)

(72) Inventors: Rei Sakohata, Sakai City (JP); Kazuki Koshiyama, Sakai City (JP); Akihiro Nakagawa, Sakai City (JP)

(73) Assignee: SHIMANO INC, Sakai (JP)

( * ) Notice: Subject to any disclaimer, the term of this patent is extended or adjusted under 35 U.S.C. 154(b) by 577 days.

(21) Appl. No.: 18/334,324

(22) Filed: Jun. 13, 2023

(65) Prior Publication Data

US 2024/0417020 A1 Dec. 19, 2024

(51) Int. Cl.
*B62J 45/411* (2020.01)
*B62J 45/423* (2020.01)

(52) U.S. Cl.
CPC ........... *B62J 45/411* (2020.02); *B62J 45/423* (2020.02)

(58) Field of Classification Search
CPC ......... B62J 45/411; B62J 45/423; B62M 6/50
See application file for complete search history.

(56) References Cited

U.S. PATENT DOCUMENTS

| | | | |
|---|---|---|---|
| 7,975,561 B1 | 7/2011 | Ambrosina et al. | |
| 10,184,849 B2 | 1/2019 | Jennings et al. | |
| 10,677,671 B2 | 6/2020 | Jennings et al. | |
| 2005/0178210 A1 | 8/2005 | Lanham | |
| 2009/0120208 A1* | 5/2009 | Meyer | B62J 45/421 73/862.045 |
| 2014/0060212 A1 | 3/2014 | Tetsuka et al. | |
| 2018/0229799 A1* | 8/2018 | Lo | B62M 3/08 |
| 2019/0048952 A1* | 2/2019 | Kuwayama | F16D 66/00 |
| 2021/0199521 A1 | 7/2021 | Tachibana et al. | |

FOREIGN PATENT DOCUMENTS

| | | |
|---|---|---|
| DE | 202007019409 U1 | 6/2012 |
| DE | 102013014098 | 3/2014 |
| DE | 102020214512 | 7/2021 |

* cited by examiner

*Primary Examiner* — Xin Y Zhong
(74) *Attorney, Agent, or Firm* — MORI & WARD, LLP

(57) ABSTRACT

A sensor unit of a human-powered vehicle comprises a first sensor and a second sensor. The first sensor is configured to sense first information relating to an amount of compression in response to input torque. The second sensor is configured to sense second information relating to an amount of extension in response to the input torque.

22 Claims, 17 Drawing Sheets

SENSOR UNIT OF HUMAN-POWERED VEHICLE, ROTARY DEVICE, AND TORQUE SENSING METHOD

BACKGROUND

Technical Field

The present invention relates to a sensor unit of a human-powered vehicle and a rotary device.

Background Information

A human-powered vehicle includes a rotary device. The rotary device includes a force sensor configured to sense a force applied to the rotary device. One of objects of the present disclosure is to improve accuracy of calculation of the input torque.

SUMMARY

In accordance with a first aspect of the present invention, a sensor unit of a human-powered vehicle comprises a first sensor and a second sensor. The first sensor is configured to sense first information relating to an amount of compression in response to input torque. The second sensor is configured to sense second information relating to an amount of extension in response to the input torque.

With the sensor unit according to the first aspect, it is possible to reduce or eliminate the impact of a change in temperature on calculation of the input torque using the first information and the second information. Thus, it is possible to improve accuracy of the calculation of the input torque.

In accordance with a second aspect of the present invention, the sensor unit according to the first aspect further comprises electronic controller circuitry electrically connected to the first sensor and the second sensor. The electronic controller circuitry is configured to obtain the input torque based on a difference between the amount of compression and the amount of extension.

With the sensor unit according to the second aspect, it is possible to reliably reduce or eliminate the impact of a change in temperature on calculation of the input torque using the difference between the first information and the second information. Thus, it is possible to reliably improve accuracy of the calculation of the input torque.

In accordance with a third aspect of the present invention, the sensor unit according to the first or second aspect is configured so that the electronic controller circuitry includes a wireless communicator configured to wirelessly communicate with an additional wireless communicator.

With the sensor unit according to the third aspect, it is possible to wirelessly transmit information relating to the input torque to an additional device including the additional wireless communicator. Thus, it is possible to use the information relating to the input torque in the additional device.

In accordance with a fourth aspect of the present invention, a rotary device comprises a first portion, a second portion, and the sensor unit according to any one of the first to third aspects. The first portion is configured to receive a first force in a compression direction in response to the input torque. The second portion is configured to receive a second force in an extension direction in response to the input torque.

With the rotary device according to the fourth aspect, it is possible to obtain the input torque applied to the rotary device using the sensor unit.

In accordance with a fifth aspect of the present invention, a rotary device comprises a first portion, a second portion, and a sensor unit. The first portion is configured to receive a first force in a compression direction in response to input torque. The second portion is configured to receive a second force in an extension direction in response to the input torque. The sensor unit is configured to measure the first force and the second force.

With the rotary device according to the fifth aspect, it is possible to reduce or eliminate the impact of a change in temperature on calculation of the input torque using the first force and the second force. Thus, it is possible to improve accuracy of the calculation of the input torque.

In accordance with a sixth aspect of the present invention, the sensor unit according to the fourth or fifth aspect is configured so that the sensor unit includes a first sensor and a second sensor. The first sensor is provided to the first portion. The second sensor is provided to the second portion.

With the rotary device according to the sixth aspect, it is possible to accurately obtain the first force and the second force. Thus, it is possible to reliably improve accuracy of the calculation of the input torque.

In accordance with a seventh aspect of the present invention, the sensor unit according to the sixth aspect is configured so that the first sensor includes a first strain gauge provided to the first portion. The second sensor includes a second strain gauge provided to the second portion.

With the rotary device according to the seventh aspect, it is possible to obtain the first force and the second force using a comparatively simple structure.

In accordance with an eighth aspect of the present invention, the sensor unit according to any one of the fifth to seventh aspects is configured so that the first portion is configured to be compressed in response to the first force. The second portion is configured to be extended in response to the second force.

With the rotary device according to the eighth aspect, it is possible to accurately obtain the first force and the second force. Thus, it is possible to reliably improve accuracy of the calculation of the input torque.

In accordance with an ninth aspect of the present invention, the sensor unit according to any one of the fifth to eighth aspects further comprises a first extending part extending radially with respect to a rotational axis. The first extending part includes a first surface and a second surface. The first surface faces in a first circumferential direction. The second surface faces in a second circumferential direction. The first circumferential direction is opposite to the second circumferential direction. Each of the first surface and the second surface extends axially with respect to the rotational axis.

With the rotary device according to the ninth aspect, the first extending part can reliably receive the input torque. Thus, it is possible to accurately obtain the input torque using the first force and the second force.

In accordance with a tenth aspect of the present invention, the sensor unit according to the ninth aspect is configured so that the first extending part includes the first portion. The first portion is provided on the first surface.

With the rotary device according to the tenth aspect, it is possible to accurately obtain the input torque using the first portion.

In accordance with an eleventh aspect of the present invention, the sensor unit according to the ninth or tenth aspect is configured so that the first extending part includes the second portion. The second portion is provided on the second surface.

With the rotary device according to the eleventh aspect, it is possible to accurately obtain the input torque using the second portion.

In accordance with a twelfth aspect of the present invention, the sensor unit according to the eleventh aspect is configured so that the first sensor is provided on the first surface. The second sensor is provided on the second surface.

With the rotary device according to the twelfth aspect, it is possible to more accurately obtain the input torque using the second portion.

In accordance with a thirteenth aspect of the present invention, the sensor unit according to any one of the ninth to twelfth aspects is configured so that the first extending part includes a first radially inner end and a first radially outer end. The first extending part extends radially outwardly from the first radially inner end to the first radially outer end. The first portion is at least partially provided radially between the first radially inner end and the first radially outer end.

With the rotary device according to the thirteenth aspect, the first extending part can more reliably receive the input torque. Thus, it is possible to more accurately obtain the input torque using the first force and the second force.

In accordance with a fourteenth aspect of the present invention, the sensor unit according to any one of the ninth to thirteenth aspects is configured so that the first extending part has a first longitudinal center axis and extends along the first longitudinal center axis. The first extending part has a symmetrical shape with respect to the first longitudinal center axis as viewed along the rotational axis.

With the rotary device according to the fourteenth aspect, it is possible to accurately obtain the input torque using the first extending part.

In accordance with a fifteenth aspect of the present invention, the sensor unit according to any one of the ninth to fourteenth aspects further comprises a second extending part extending radially with respect to the rotational axis. The second extending part has a third surface and a fourth surface. The third surface faces in the first circumferential direction. The fourth surface faces in the second circumferential direction. The second extending part includes the second portion. The second portion is provided on the fourth surface.

With the rotary device according to the fifteenth aspect, it is possible to more accurately obtain the input torque using the first extending part and the second extending part.

In accordance with a sixteenth aspect of the present invention, the sensor unit according to the fifteenth aspect is configured so that the first sensor is provided on the first surface. The second sensor is provided on the fourth surface.

With the rotary device according to the sixteenth aspect, it is possible to more accurately obtain the input torque using the first sensor and the second sensor.

In accordance with a seventeenth aspect of the present invention, the sensor unit according to the fifteenth or sixteenth aspect is configured so that the second extending part includes a second radially inner end and a second radially outer end. The second extending part extends radially outwardly from the second radially inner end to the second radially outer end. The second portion is at least partially provided radially between the second radially inner end and the second radially outer end.

With the rotary device according to the seventeenth aspect, the second extending part can reliably receive the input torque. Thus, it is possible to more accurately obtain the input torque using the first force and the second force.

In accordance with an eighteenth aspect of the present invention, the sensor unit according to any one of the fifteenth to seventeenth aspects is configured so that the second extending part has a second longitudinal center axis and extends along the second longitudinal center axis. The second extending part has a symmetrical shape with respect to the second longitudinal center axis as viewed along the rotational axis.

With the rotary device according to the eighteenth aspect, it is possible to accurately obtain the input torque using the second extending part.

In accordance with a nineteenth aspect of the present invention, the sensor unit according to any one of the fifteenth to eighteenth aspects is configured so that the second extending part is circumferentially adjacent to the first extending part without another extending part between the first extending part and the second extending part.

With the rotary device according to the nineteenth aspect, it is possible to arrange the first extending part and the second extending part under the same or similar circumstances.

In accordance with a twentieth aspect of the present invention, the sensor unit according to any one of the fifth to nineteenth aspects is configured so that the first extending part has a first shape as viewed along the rotational axis. The second extending part has a second shape as viewed along the rotational axis. The second shape is identical to the first shape.

With the rotary device according to the twentieth aspect, it is possible to reduce or eliminate a difference between a deformation amount of the first extending part and a deformation amount of the second extending part.

In accordance with a twenty-first aspect of the present invention, the sensor unit according to any one of the ninth to twentieth aspects further comprises a radially outer part and a radially inner part. The radially outer part extends circumferentially about a rotational axis. The radially inner part is provided radially inwardly of the radially outer part. The first extending part extends radially between the radially outer part and the radially inner part.

With the rotary device according to the twenty-first aspect, it is possible to reliably receive the input torque using the first extending part.

In accordance with a twenty-second aspect of the present invention, the sensor unit according to the twenty-first aspect is configured so that the first extending part is at least partially provided integrally with the radially inner part as a one-piece unitary member.

With the rotary device according to the twenty-second aspect, it is possible to tightly couple the first extending part and the radially inner part with a comparatively simple structure.

In accordance with a twenty-third aspect of the present invention, the sensor unit according to the twenty-first or twenty-second aspect is configured so that the radially outer part includes a friction member.

With the rotary device according to the twenty-third aspect, it is possible to receive the input torque using the friction member.

In accordance with a twenty-fourth aspect of the present invention, the sensor unit according to any one of the fifth to twenty-third aspects is configured so that a first radial distance is defined from a rotational axis to the first sensor.

A second radial distance is defined from the rotational axis to the second sensor. The first radial distance is equal to the second radial distance.

With the rotary device according to the twenty-fourth aspect, it is possible to equally obtain the first information and the second information using the first sensor and the second sensor.

In accordance with a twenty-fifth aspect of the present invention, the sensor unit according to any one of the fifth to twenty-fourth aspects is configured so that the sensor unit includes electronic controller circuitry. The electronic controller circuitry is configured to obtain torque applied to the rotary device based on a difference between the first force and the second force.

With the rotary device according to the twenty-fifth aspect, it is possible to reliably reduce or eliminate the impact of a change in temperature on calculation of the input torque using the difference between first force and the second force. Thus, it is possible to reliably improve accuracy of the calculation of the input torque.

In accordance with a twenty-sixth aspect of the present invention, a torque sensing method in a human-powered vehicle comprises obtaining first information relating to an amount of compression in response to input torque using a first sensor; obtaining second information relating to an amount of extension in response to the input torque using a second sensor; and calculating input torque based on a difference between the first information and the second information.

With the rotary device according to the twenty-sixth aspect, it is possible to reduce or eliminate the impact of a change in temperature on calculation of the input torque using the first information and the second information. Thus, it is possible to improve accuracy of the calculation of the input torque.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
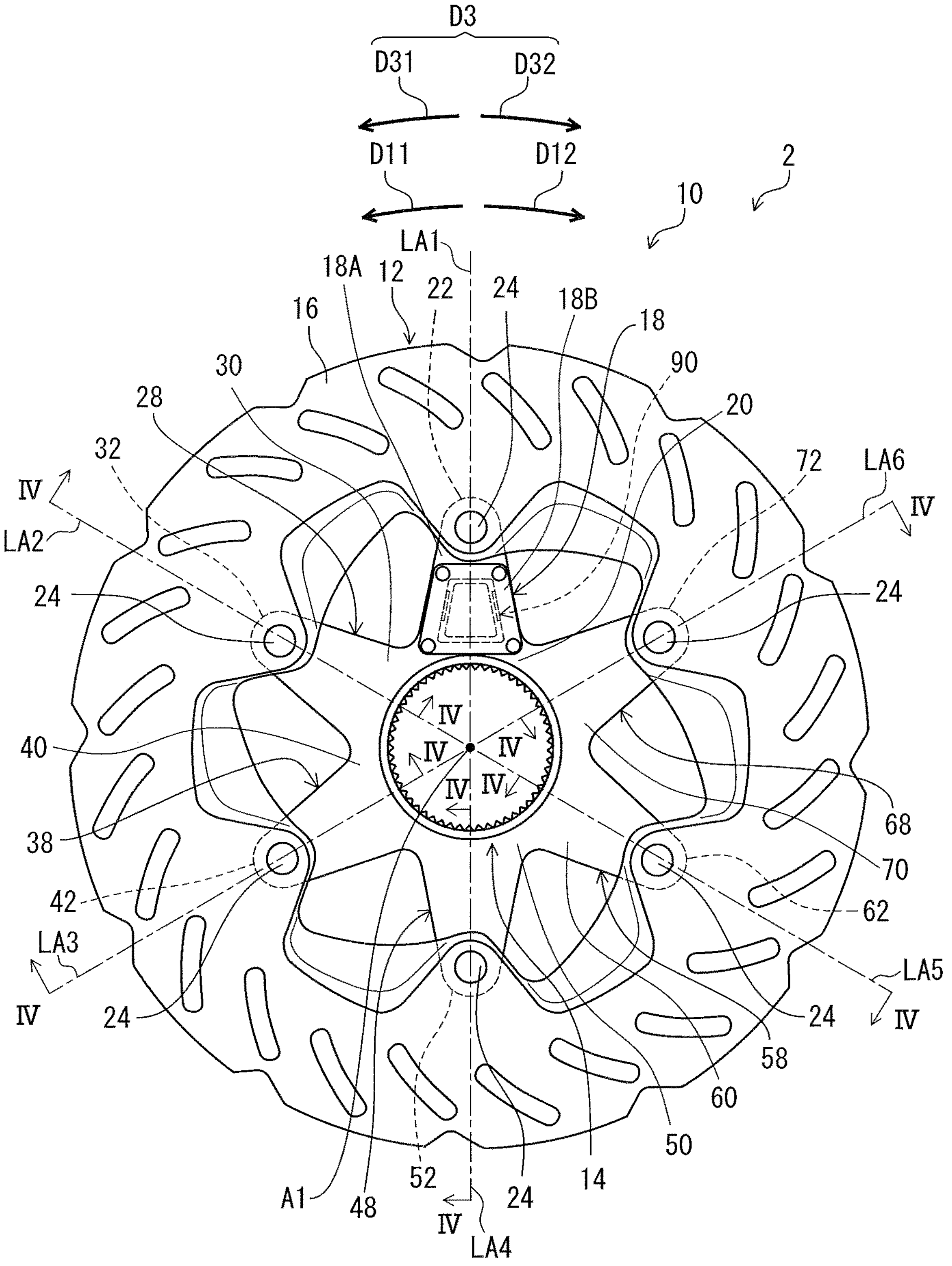
FIG. 1 is a side elevational view of a rotary device including a sensor unit in accordance with a first embodiment.

The embodiments will now be described with reference to the accompanying drawings, wherein like reference numerals designate corresponding or identical elements throughout the various drawings.

First Embodiment

As seen in FIG. 1, a rotary device 10 for a human-powered vehicle 2 is rotatable relative to a vehicle body of the human-powered vehicle 2 about a rotational axis A1. The rotary device 10 is coupled to a hub body of a hub assembly of the human-powered vehicle 2. The rotary device 10 is rotatable in a driving rotational direction D11 during pedaling. A circumferential direction D3 is defined about the rotational axis A1. The circumferential direction D3 includes a first circumferential direction D31 and a second circumferential direction D32. The first circumferential direction D31 is opposite to the second circumferential direction D32. The first circumferential direction D31 is the same direction as the driving rotational direction D11. In the present embodiment, the rotary device 10 includes a disc brake rotor. However, the rotary device 10 can include another device other than the disc brake rotor if needed or desired.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 2 with facing a handlebar or steering. Examples of the user's standard position include a saddle and a seat. Accordingly, these terms, as utilized to describe the rotary device 10 or other components, should be interpreted relative to the human-powered vehicle 2 equipped with the rotary device 10 or other components as used in an upright riding position on a horizontal surface.

As seen in FIG. 1, the rotary device 10 comprises a radially outer part 12 and a radially inner part 14. The radially outer part 12 extends circumferentially about the rotational axis A1. The radially inner part 14 is provided radially inwardly of the radially outer part 12. The radially outer part 12 has an annular shape. The radially inner part 14 has an annular shape. The radially inner part 14 is configured to be engaged with the hub assembly of the human-powered vehicle 2. However, the radially outer part 12 can have shapes other than the annular shape if needed or desired. The radially inner part 14 can have shapes other than the annular shape if needed or desired.

The radially outer part 12 includes a friction member 16. The friction member 16 extends circumferentially about the rotational axis A1. The friction member 16 has an annular shape. The friction member 16 is configured to receive a braking force from a disc brake caliper of the human-powered vehicle 2. However, the friction member 16 can be omitted from the radially outer part 12 if needed or desired.

The rotary device 10 further comprises a first extending part 18. The first extending part 18 extends radially with respect to the rotational axis A1. The first extending part 18 extends radially between the radially outer part 12 and the radially inner part 14.

The first extending part 18 includes a first radially inner end 20 and a first radially outer end 22. The first extending part 18 extends radially outwardly from the first radially inner end 20 to the first radially outer end 22. The rotary device 10 includes fasteners 24. The friction member 16 is secured to the first radially outer end 22 with the fastener 24.

The first extending part 18 has a first longitudinal center axis LA1 and extends along the first longitudinal center axis LA1. The first extending part 18 has a symmetrical shape with respect to the first longitudinal center axis LA1 as viewed along the rotational axis A1. However, the first extending part 18 can have an asymmetrical shape with respect to the first longitudinal center axis LA1 as viewed along the rotational axis A1 if needed or desired.

The rotary device 10 further comprises a second extending part 28. The second extending part 28 extends radially with respect to the rotational axis A1. The second extending part 28 is circumferentially adjacent to the first extending part 18 without another extending part between the first extending part 18 and the second extending part 28. The second extending part 28 extends radially between the radially outer part 12 and the radially inner part 14.

The second extending part 28 includes a second radially inner end 30 and a second radially outer end 32. The second extending part 28 extends radially outwardly from the second radially inner end 30 to the second radially outer end 32. The friction member 16 is secured to the second radially outer end 32 with the fastener 24.

The second extending part 28 has a second longitudinal center axis LA2 and extends along the second longitudinal center axis LA2. The second extending part 28 has a symmetrical shape with respect to the second longitudinal center axis LA2 as viewed along the rotational axis A1. However, the second extending part 28 can have an asymmetrical shape with respect to the second longitudinal center axis LA2 as viewed along the rotational axis A1 if needed or desired.

The rotary device 10 further comprises a third extending part 38. The third extending part 38 extends radially with respect to the rotational axis A1. The third extending part 38 is circumferentially adjacent to the second extending part 28 without another extending part between the second extending part 28 and the third extending part 38. The third extending part 38 extends radially between the radially outer part 12 and the radially inner part 14.

The third extending part 38 includes a third radially inner end 40 and a third radially outer end 42. The third extending part 38 extends radially outwardly from the third radially inner end 40 to the third radially outer end 42. The friction member 16 is secured to the third radially outer end 42 with the fastener 24.

The third extending part 38 has a third longitudinal center axis LA3 and extends along the third longitudinal center axis LA3. The third extending part 38 has a symmetrical shape with respect to the third longitudinal center axis LA3 as viewed along the rotational axis A1. However, the third extending part 38 can have an asymmetrical shape with respect to the third longitudinal center axis LA3 as viewed along the rotational axis A1 if needed or desired.

The rotary device 10 further comprises a fourth extending part 48. The fourth extending part 48 extends radially with respect to the rotational axis A1. The fourth extending part 48 is circumferentially adjacent to the third extending part 38 without another extending part between the third extending part 38 and the fourth extending part 48. The fourth extending part 48 extends radially between the radially outer part 12 and the radially inner part 14.

The fourth extending part 48 includes a fourth radially inner end 50 and a fourth radially outer end 52. The fourth extending part 48 extends radially outwardly from the fourth radially inner end 50 to the fourth radially outer end 52. The friction member 16 is secured to the fourth radially outer end 52 with the fastener 24.

The fourth extending part 48 has a fourth longitudinal center axis LA4 and extends along the fourth longitudinal center axis LA4. The fourth extending part 48 has a symmetrical shape with respect to the fourth longitudinal center axis LA4 as viewed along the rotational axis A1. However, the fourth extending part 48 can have an asymmetrical shape with respect to the fourth longitudinal center axis LA4 as viewed along the rotational axis A1 if needed or desired.

The rotary device 10 further comprises a fifth extending part 58. The fifth extending part 58 extends radially with respect to the rotational axis A1. The fifth extending part 58 is circumferentially adjacent to the fourth extending part 48 without another extending part between the fourth extending part 48 and the fifth extending part 58. The fifth extending part 58 extends radially between the radially outer part 12 and the radially inner part 14.

The fifth extending part 58 includes a fifth radially inner end 60 and a fifth radially outer end 62. The fifth extending part 58 extends radially outwardly from the fifth radially inner end 60 to the fifth radially outer end 62. The friction member 16 is secured to the fifth radially outer end 62 with the fastener 24.

The fifth extending part 58 has a fifth longitudinal center axis LA5 and extends along the fifth longitudinal center axis LA5. The fifth extending part 58 has a symmetrical shape with respect to the fifth longitudinal center axis LA5 as viewed along the rotational axis A1. However, the fifth extending part 58 can have an asymmetrical shape with respect to the fifth longitudinal center axis LA5 as viewed along the rotational axis A1 if needed or desired.

The rotary device 10 further comprises a sixth extending part 68. The sixth extending part 68 extends radially with respect to the rotational axis A1. The sixth extending part 68 is circumferentially adjacent to the fifth extending part 58 without another extending part between the fifth extending part 58 and the sixth extending part 68. The sixth extending part 68 extends radially between the radially outer part 12 and the radially inner part 14.

The sixth extending part 68 includes a sixth radially inner end 70 and a sixth radially outer end 72. The sixth extending part 68 extends radially outwardly from the sixth radially inner end 70 to the sixth radially outer end 72. The friction member 16 is secured to the sixth radially outer end 72 with the fastener 24.

The sixth extending part 68 has a sixth longitudinal center axis LA6 and extends along the sixth longitudinal center axis LA6. The sixth extending part 68 has a symmetrical shape with respect to the sixth longitudinal center axis LA6 as viewed along the rotational axis A1. However, the sixth extending part 68 can have an asymmetrical shape with respect to the sixth longitudinal center axis LA6 as viewed along the rotational axis A1 if needed or desired.

The first extending part 18, the second extending part 28, the third extending part 38, the fourth extending part 48, the fifth extending part 58, and the sixth extending part 68 are arranged in the circumferential direction D3 at regular intervals. However, the arrangement of the first extending part 18, the second extending part 28, the third extending part 38, the fourth extending part 48, the fifth extending part 58, and the sixth extending part 68 is not limited to the illustrated embodiment. A total number of extending parts is not limited to the illustrated embodiment.

The first extending part 18 has a first shape as viewed along the rotational axis A1. The second extending part 28 has a second shape as viewed along the rotational axis A1. The third extending part 38 has a third shape as viewed along the rotational axis A1. The fourth extending part 48 has a fourth shape as viewed along the rotational axis A1. The fifth extending part 58 has a fifth shape as viewed along the rotational axis A1. The sixth extending part 68 has a sixth shape as viewed along the rotational axis A1.

In the present embodiment, the second shape is identical to the first shape. The third shape, the fourth shape, the fifth shape, and the sixth shape are identical to the first shape. However, the second shape, the third shape, the fourth shape, the fifth shape, and the sixth shape can be different from the first shape if needed or desired.

Figure 2:
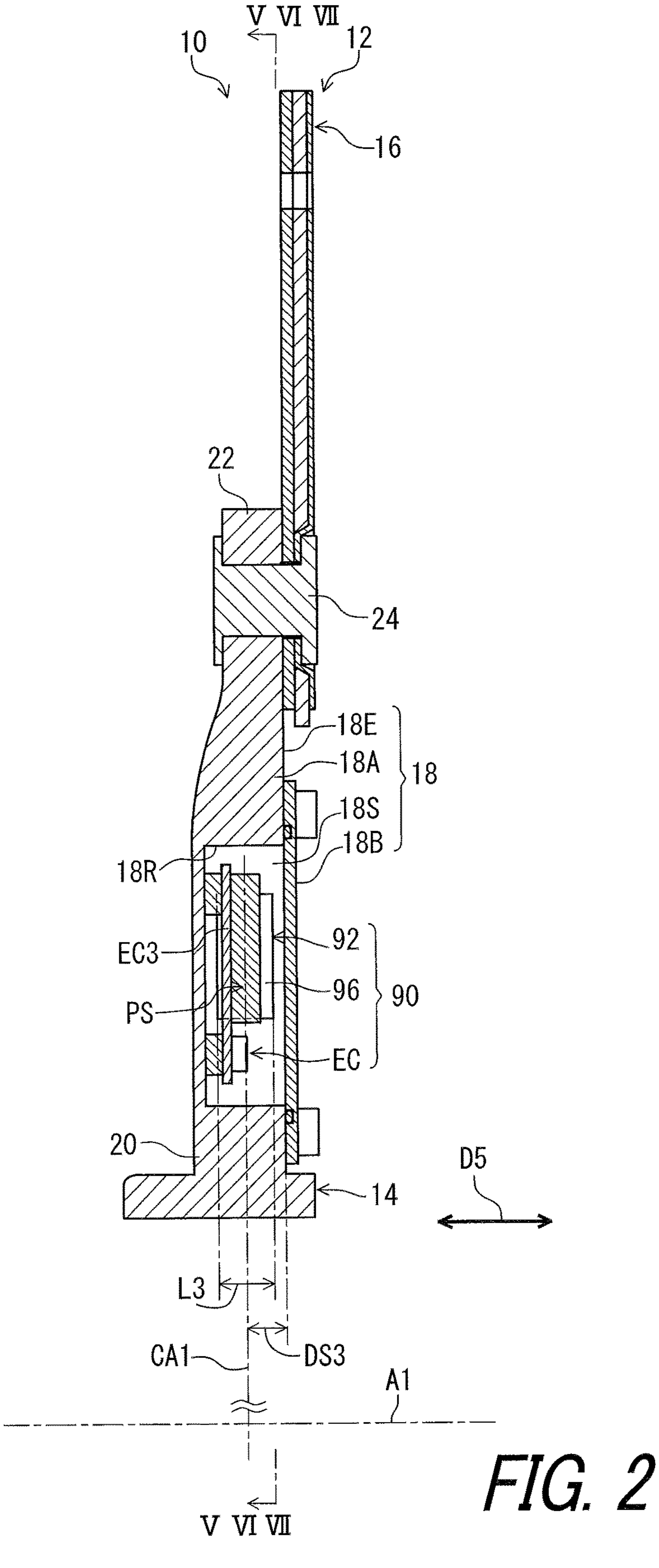
FIG. 2 is a cross-sectional view of the rotary device taken along line II-II of FIG. 3.

As seen in FIG. 2, the first extending part 18 is at least partially provided integrally with the radially inner part 14 as a one-piece unitary member. In the present embodiment, the first extending part 18 is partially provided integrally with the radially inner part 14 as a one-piece unitary member. However, the first extending part 18 can be entirely provided integrally with the radially inner part 14 as a one-piece unitary member if needed or desired.

The first extending part 18 includes a first base 18A, a first lid 18B, and a first internal space 18S. The first base 18A and the first lid 18B define the first internal space 18S. The first base 18A includes a first recess 18R. The first internal space 18S is defined in the first recess 18R.

Figure 3:
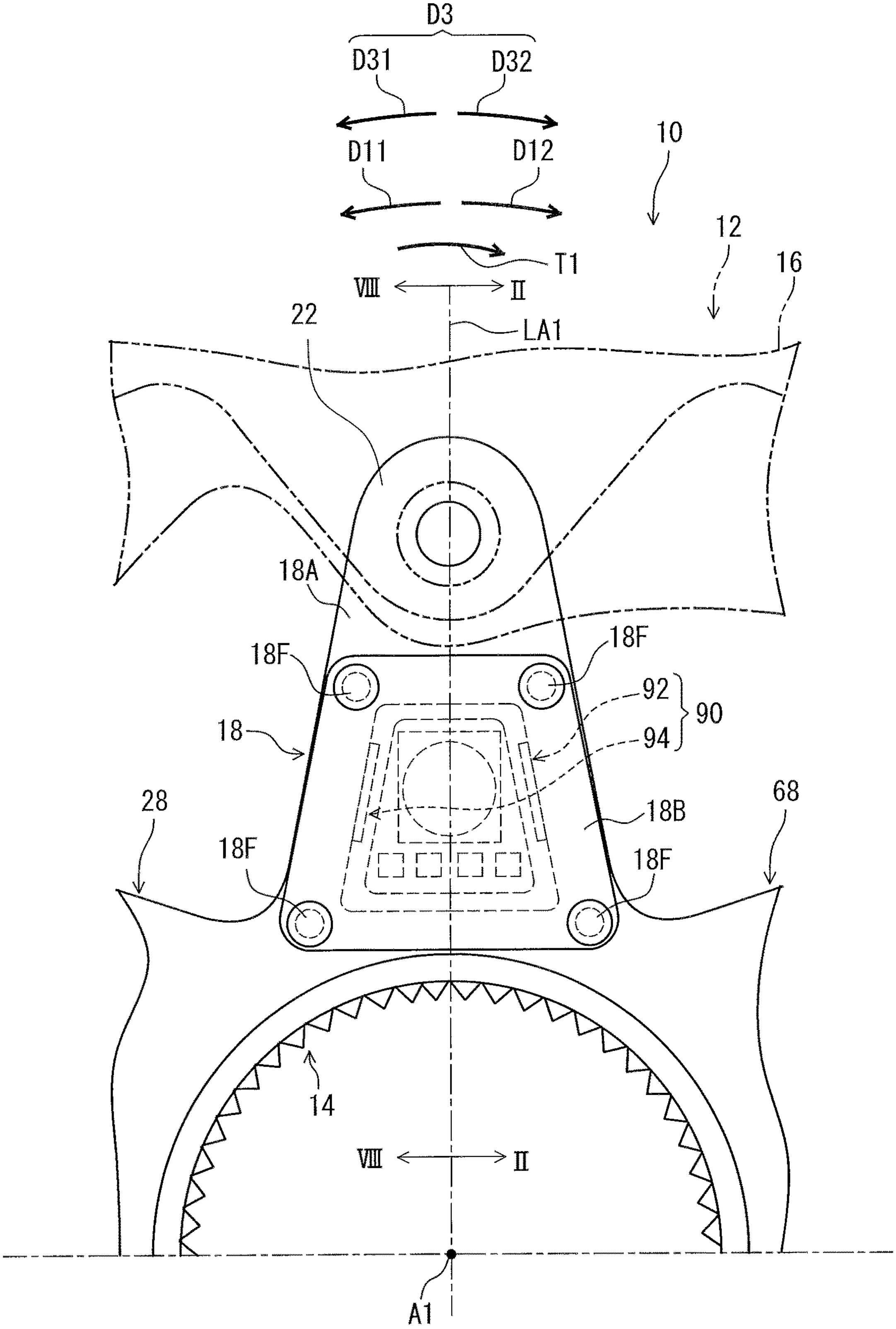
FIG. 3 is a partial side elevational view of the rotary device illustrated in FIG. 1.

As seen in FIG. 3, the first extending part 18 includes at least two first fasteners 18F. The first lid 18B is secured to the first base 18A with the first fasteners 18F. The first lid 18B is at least partially provided radially between the radially outer part 12 and the radially inner part 14 as viewed along the rotational axis A1. In the present embodiment, the first lid 18B is entirely provided between the radially outer part 12 and the radially inner part 14 as viewed along the rotational axis A1. However, the first lid 18B can be partially provided between the radially outer part 12 and the radially inner part 14 as viewed along the rotational axis A1.

Figure 4:
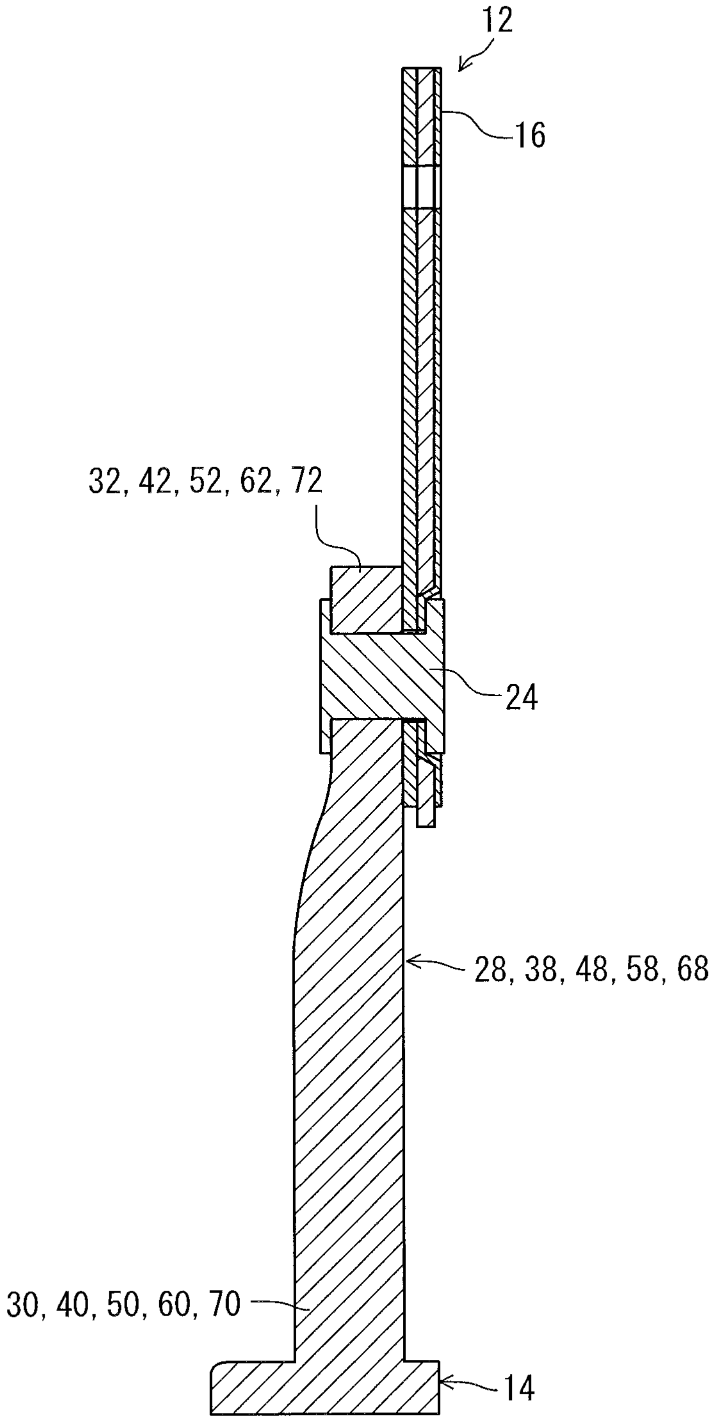
FIG. 4 is a cross-sectional view of the rotary device taken along each line IV-IV of FIG. 1.

As seen in FIG. 4, the second extending part 28 is at least partially provided integrally with the radially inner part 14 as a one-piece unitary member. In the present embodiment, the second extending part 28 is entirely provided integrally with the radially inner part 14 as a one-piece unitary member. However, the second extending part 28 can be partially provided integrally with the radially inner part 14 as a one-piece unitary member if needed or desired.

The third extending part 38 is at least partially provided integrally with the radially inner part 14 as a one-piece unitary member. In the present embodiment, the third extending part 38 is entirely provided integrally with the radially inner part 14 as a one-piece unitary member. However, the third extending part 38 can be partially provided integrally with the radially inner part 14 as a one-piece unitary member if needed or desired.

The fourth extending part 48 is at least partially provided integrally with the radially inner part 14 as a one-piece unitary member. In the present embodiment, the fourth extending part 48 is entirely provided integrally with the radially inner part 14 as a one-piece unitary member. However, the fourth extending part 48 can be partially provided integrally with the radially inner part 14 as a one-piece unitary member if needed or desired.

The fifth extending part 58 is at least partially provided integrally with the radially inner part 14 as a one-piece unitary member. In the present embodiment, the fifth extending part 58 is entirely provided integrally with the radially inner part 14 as a one-piece unitary member. However, the fifth extending part 58 can be partially provided integrally with the radially inner part 14 as a one-piece unitary member if needed or desired.

The sixth extending part 68 is at least partially provided integrally with the radially inner part 14 as a one-piece unitary member. In the present embodiment, the sixth extending part 68 is entirely provided integrally with the radially inner part 14 as a one-piece unitary member. However, the sixth extending part 68 can be partially provided integrally with the radially inner part 14 as a one-piece unitary member if needed or desired.

Figure 5:
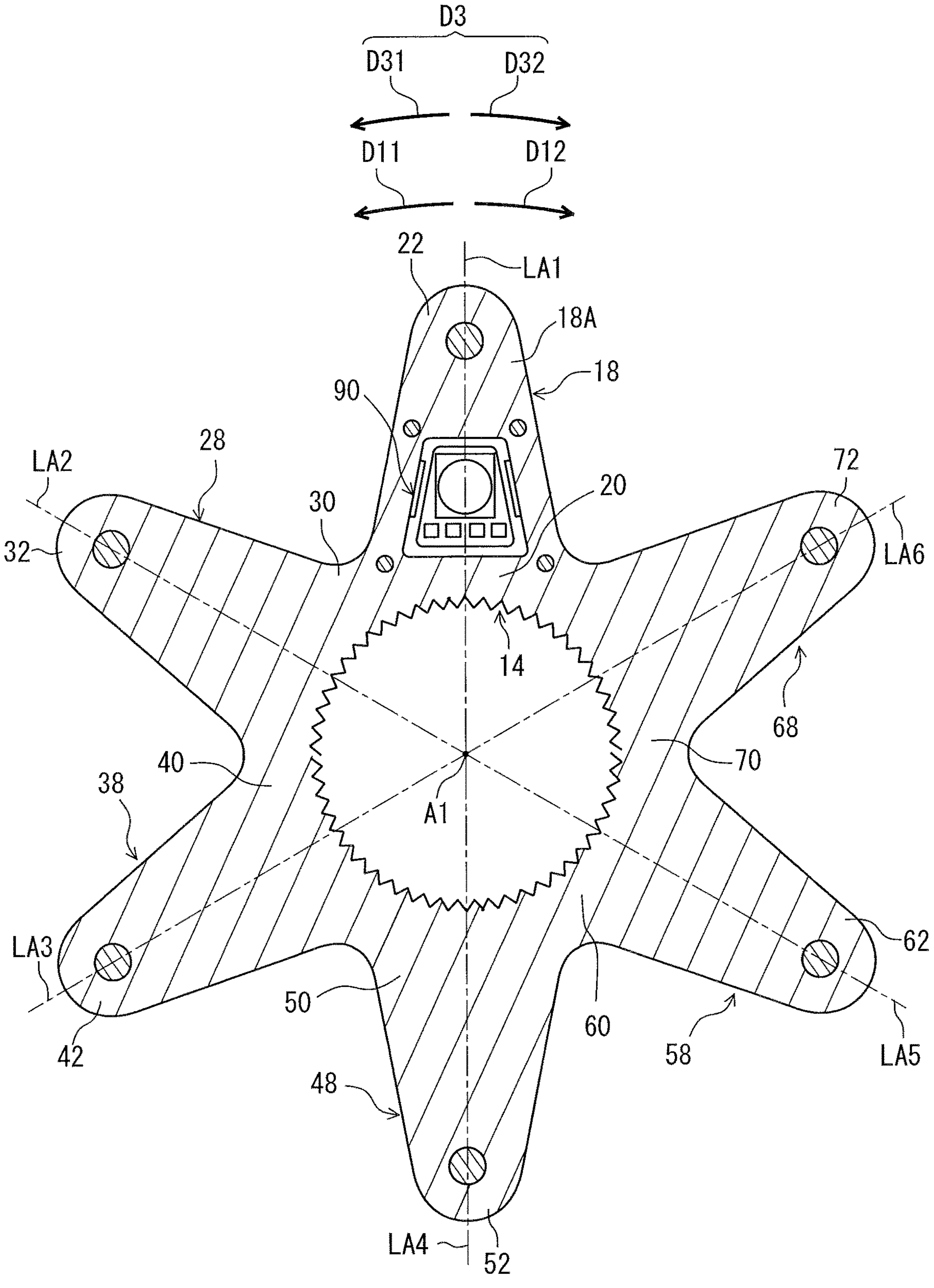
FIG. 5 is a cross-sectional view of the rotary device taken along line V-V of FIG. 2.

As seen in FIG. 5, the first base 18A, the second extending part 28, the third extending part 38, the fourth extending part 48, the fifth extending part 58, and the sixth extending part 68 are integrally provided as a one-piece unitary member. However, at least one of the first base 18A, the second extending part 28, the third extending part 38, the fourth extending part 48, the fifth extending part 58, and the sixth extending part 68 can be a separate member from another of the first base 18A, the second extending part 28, the third extending part 38, the fourth extending part 48, the fifth extending part 58, and the sixth extending part 68 if needed or desired.

Figure 6:
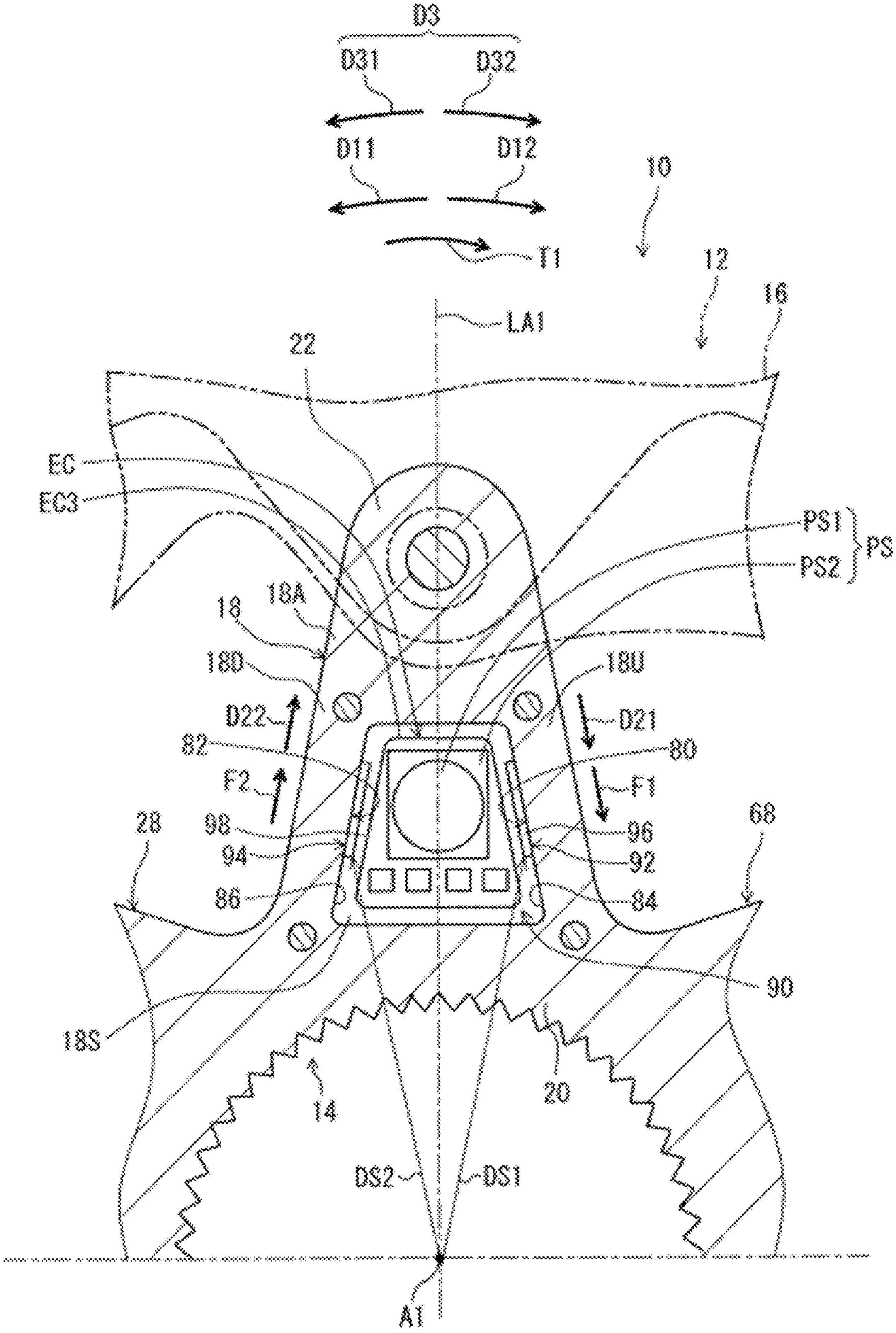
FIG. 6 is a partial cross-sectional view of the rotary device taken along line VI-VI of FIG. 2.

As seen in FIG. 6, the rotary device 10 comprises a first portion 80 and a second portion 82. The first portion 80 is configured to receive a first force F1 in a compression direction D21 in response to input torque T1. The second portion 82 is configured to receive a second force F2 in an extension direction D22 in response to the input torque T1. The first portion 80 is configured to be compressed in response to the first force F1. The second portion 82 is configured to be extended in response to the second force F2.

The first extending part 18 includes a first surface 84 and a second surface 86. The first surface 84 faces in the first circumferential direction D31. The second surface 86 faces in the second circumferential direction D32. Each of the first surface 84 and the second surface 86 extends axially with respect to the rotational axis A1.

In the present embodiment, the first extending part 18 includes the first portion 80. The first portion 80 is provided on the first surface 84. The first extending part 18 includes the second portion 82. The second portion 82 is provided on the second surface 86. However, the arrangement of the first portion 80 and the second portion 82 is not limited to the illustrated embodiment.

The first portion 80 is at least partially provided radially between the first radially inner end 20 and the first radially outer end 22. The second portion 82 is at least partially provided radially between the first radially inner end 20 and the first radially outer end 22. In the present embodiment, the first portion 80 is entirely provided radially between the first radially inner end 20 and the first radially outer end 22. The second portion 82 is entirely provided radially between the first radially inner end 20 and the first radially outer end 22. However, the first portion 80 can be partially provided radially between the first radially inner end 20 and the first radially outer end 22 if needed or desired. The second portion 82 can be partially provided radially between the first radially inner end 20 and the first radially outer end 22 if needed or desired.

As seen in FIG. 6, the rotary device 10 comprises a sensor unit 90. The sensor unit 90 is configured to measure the first force F1 and the second force F2. The sensor unit 90 of the human-powered vehicle 2 comprises a first sensor 92 and a second sensor 94. The first sensor 92 is configured to sense first information relating to an amount of compression in response to input torque T1. The second sensor 94 is configured to sense second information relating to an amount of extension in response to the input torque T1. The input torque T1 is applied to the radially outer part 12 in an opposite direction D12 of the driving rotational direction D11 during braking.

The first sensor 92 is at least partially provided to the first portion 80. The second sensor 94 is at least partially provided to the second portion 82. The first sensor 92 is at least partially provided on the first surface 84. The second sensor 94 is at least partially provided on the second surface 86. The first sensor 92 is configured to sense the first information relating to the amount of compression of the first portion 80 in response to the input torque T1. The second sensor 94 is configured to sense the second information relating to the amount of extension of the second portion 82 in response to the input torque T1.

In the present embodiment, the first sensor 92 is at least partially provided to the first extending part 18, and the second sensor 94 is provided to the first extending part 18. However, the first sensor 92 and the second sensor 94 can be respectively provided to different extending parts if needed or desired.

The first sensor 92 includes a first strain gauge 96. The first strain gauge 96 is at least partially provided to the first portion 80. The first strain gauge 96 is attached to the first portion 80. The first strain gauge 96 is configured to output a change in electrical resistance depending on a deformation amount of the first portion 80. The first information can include the change in electrical resistance of the first strain gauge 96. In the present embodiment, the first strain gauge 96 is entirely provided to the first portion 80. However, the first strain gauge 96 can be partially provided to the first portion 80 if needed or desired.

The second sensor 94 includes a second strain gauge 98. The second strain gauge 98 is at least partially provided to the second portion 82. The second strain gauge 98 is attached to the second portion 82. The second strain gauge 46 is configured to output a change in electrical resistance depending on a deformation amount of the second portion 82. The second information can include the change in electrical resistance of the second strain gauge 98. In the present embodiment, the second strain gauge 98 is entirely provided to the second portion 82. However, the second strain gauge 98 can be partially provided to the second portion 82 if needed or desired.

A first radial distance DS1 is defined from the rotational axis A1 to the first sensor 92. A second radial distance DS2 is defined from the rotational axis A1 to the second sensor 94. In the present embodiment, the first radial distance DS1 is equal to the second radial distance DS2. However, the first radial distance DS1 can be different from the second radial distance DS2 if needed or desired.

Figure 7:
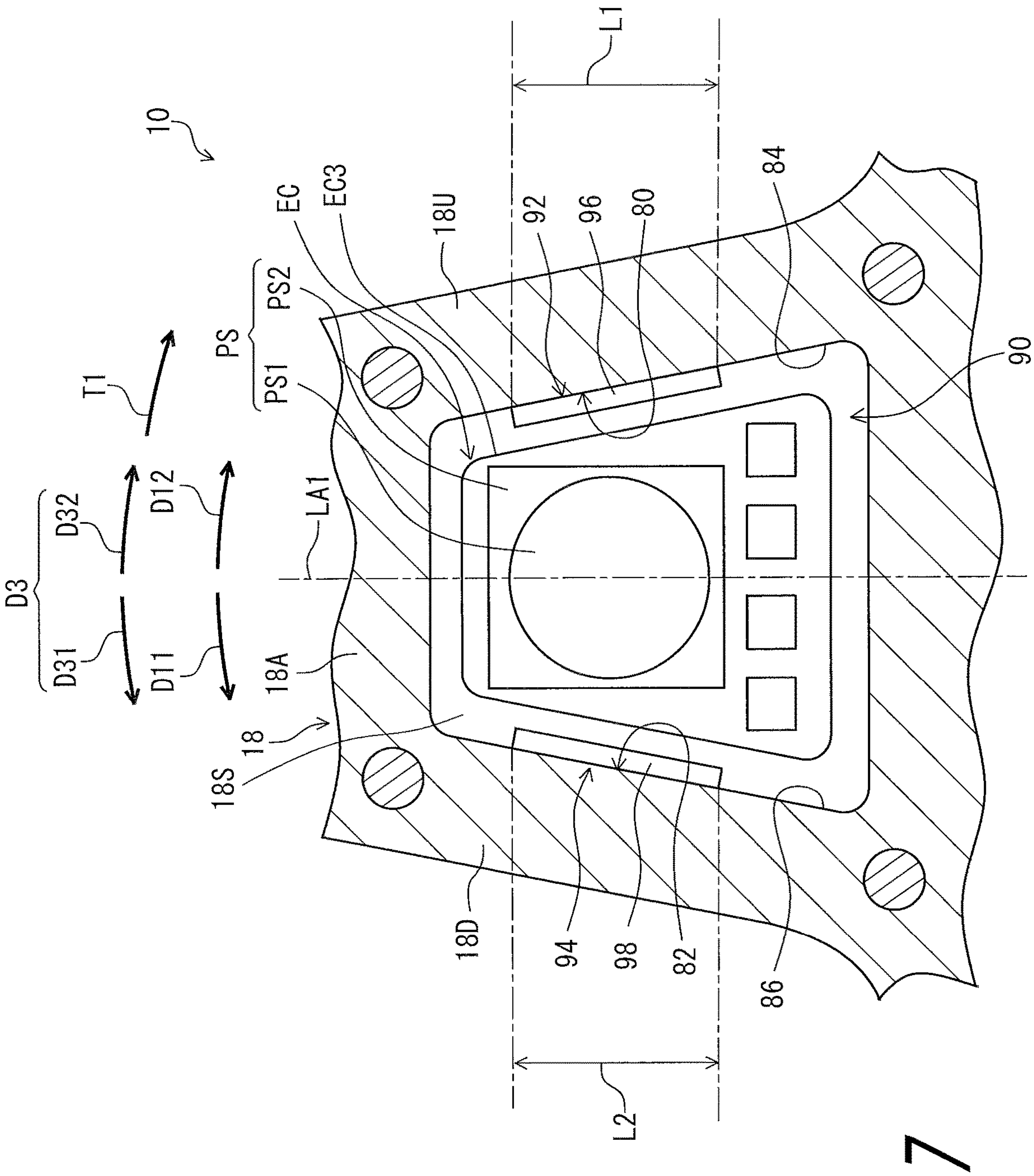
FIG. 7 is a partial cross-sectional view of the rotary device taken along line VII-VII of FIG. 2.

As seen in FIG. 7, the first extending part 18 includes a first upstream wall 18U and a first downstream wall 18D. The first downstream wall 18D is spaced apart from the first upstream wall 18U in the driving rotational direction D11. The first upstream wall 18U includes the first portion 80 and the first surface 84. The first downstream wall 18D includes the second portion 82 and the second surface 86. The first internal space 18S is provided between the first upstream wall 18U and the first downstream wall 18D. The first sensor 92 and the second sensor 94 are provided in the first internal space 18S. However, the first sensor 92 can be at least partially provided outside the first internal space 18S if needed or desired. The second sensor 94 can be at least partially provided outside the first internal space 18S if needed or desired.

The first strain gauge 96 has a first length L1 defined along the first longitudinal center axis LA1. The second strain gauge 98 has a second length L2 defined along the first longitudinal center axis LA1. The first length L1 is equal to the second length L2.

As seen in FIG. 2, the first strain gauge 96 has a third length L3 defined along the rotational axis A1. The first strain gauge 96 has a first center axis CA1 defined to bisect the third length L3 in the rotational axis A1. The first extending part 18 includes a first axial surface 18E facing in an axial direction D5 parallel to the rotational axis A1. A third distance DS3 is defined between the first center axis CA1 and the first axial surface 18E in the axial direction D5.

Figure 8:
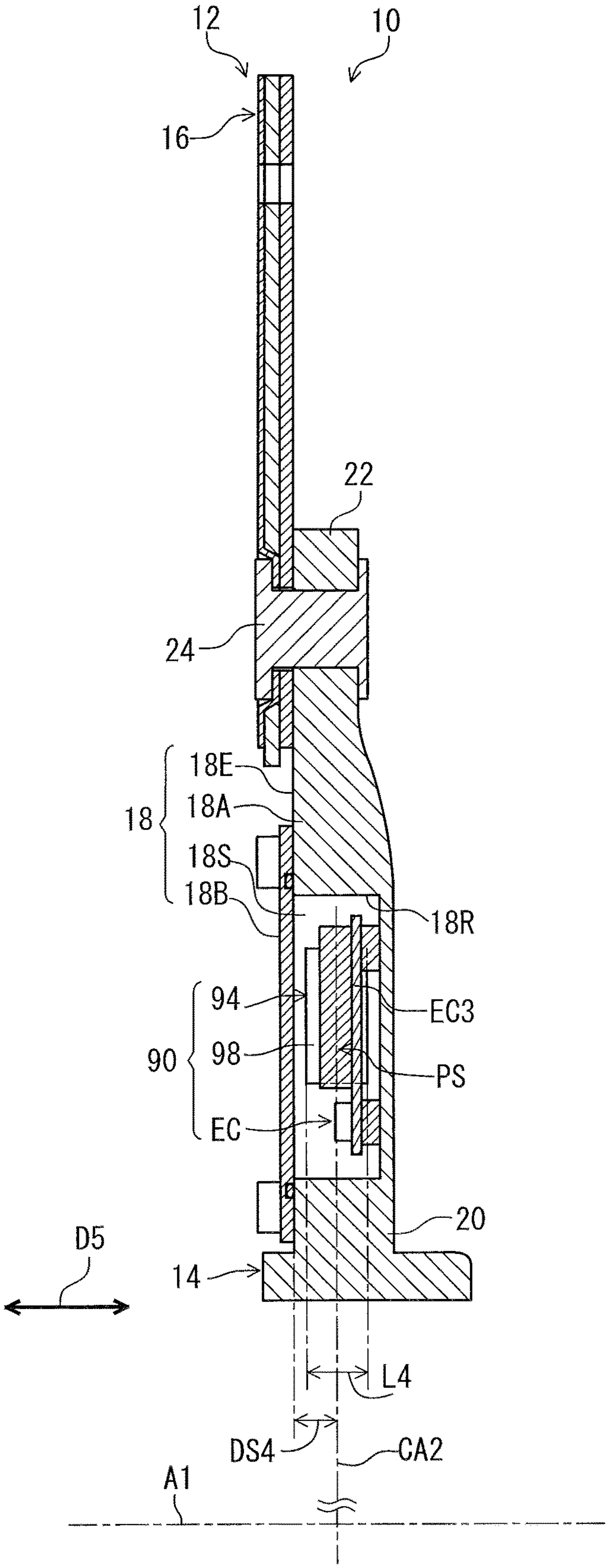
FIG. 8 is a cross-sectional view of the rotary device taken along line VIII-VIII of FIG. 3.

As seen in FIG. 8, the second strain gauge 98 has a fourth length L4 defined along the rotational axis A1. The second strain gauge 98 has a second center axis CA2 defined to bisect the fourth length L4 in the rotational axis A1. A fourth distance DS4 is defined between the second center axis CA2 and the first axial surface 18E in the axial direction D5.

As seen in FIGS. 2 and 8, the third length L3 is equal to the fourth length L4. The third distance DS3 is equal to the fourth distance DS4. Thus, the first strain gauge 96 and the second strain gauge 98 are provided in symmetrical positions relative to the first longitudinal center axis LA1 (see e.g., FIG. 6).

Figure 9:
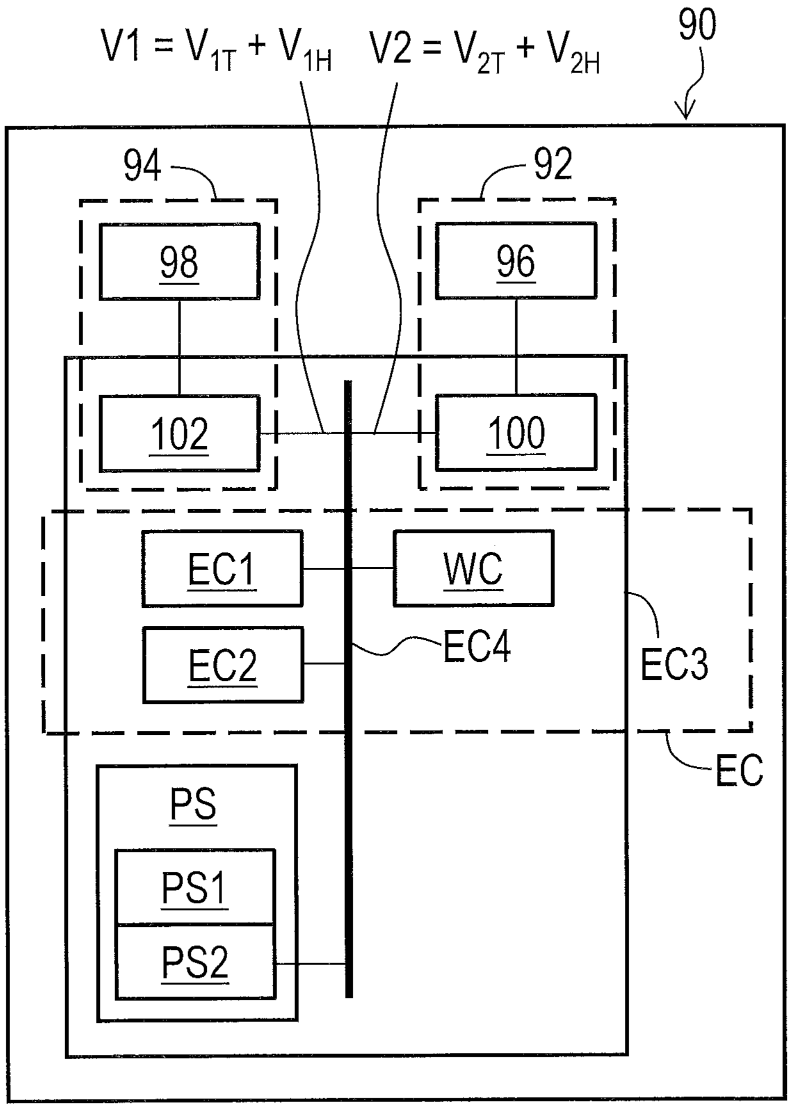
FIG. 9 is a schematic block diagram of the rotary device illustrated in FIG. 1.

As seen in FIG. 9, the first sensor 92 includes a first measurement circuit 100. The first measurement circuit 100 is electrically connected to the first strain gauge 96 to convert the output of the first strain gauge 96 to a first voltage indicating the deformation amount of the first portion 80. The first information includes the first voltage which is output from the first measurement circuit 100. For example, the first measurement circuit 100 includes a bridge circuit with the first strain gauge 96. The first strain gauge 96 is electrically connected to the first measurement circuit 100 via an additional circuit board such as a flexible printed circuit.

The second sensor 94 includes a second measurement circuit 102. The second measurement circuit 102 is electrically connected to the second strain gauge 98 to convert the output of the second strain gauge 98 to a second voltage indicating the deformation amount of the second portion 82. The second information includes the second voltage which is output from the second measurement circuit 102. For example, the second measurement circuit 102 includes a bridge circuit with the second strain gauge 98. The second strain gauge 98 is electrically connected to the second measurement circuit 102 via an additional circuit board such as a flexible printed circuit.

As seen in FIG. 9, the sensor unit 90 further comprises electronic controller circuitry EC. The electronic controller circuitry EC is electrically connected to the first sensor 92 and the second sensor 94. The electronic controller circuitry EC is configured to obtain the input torque T1 based on a difference between the first information and the second information. The electronic controller circuitry EC is configured to obtain torque applied to the rotary device 10 based on a difference between the first force F1 and the second force F2.

The electronic controller circuitry EC includes a hardware processor EC1, a hardware memory EC2, a circuit board EC3, and a system bus EC4. The hardware processor EC1 is coupled to the hardware memory EC2. The hardware memory EC2 is coupled to the hardware processor EC1. The hardware processor EC1 and the hardware memory EC2 are electrically mounted on the circuit board EC3. The hardware processor EC1 is electrically connected to the hardware memory EC2 via the circuit board EC3 and the system bus EC4. The hardware memory EC2 is electrically connected to the hardware processor EC1 via the circuit board EC3 and the system bus EC4. For example, the electronic controller circuitry EC includes a semiconductor. The hardware processor EC1 includes a semiconductor. The hardware memory EC2 includes a semiconductor. However, the electronic controller circuitry EC can be free of a semiconductor if needed or desired. The hardware processor EC1 can be free of a semiconductor if needed or desired. The hardware memory EC2 can be free of a semiconductor if needed or desired.

For example, the hardware processor EC1 includes at least one of a central processing unit (CPU), a micro processing unit (MPU), and a memory controller. The hardware memory EC2 is electrically connected to the hardware processor EC1. For example, the hardware memory EC2 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The hardware memory EC2 includes storage areas each having an address. The hardware processor EC1 is configured to control the hardware memory EC2 to store data in the storage areas of the hardware memory EC2 and reads data from the storage areas of the hardware memory EC2. The hardware memory EC2 can also be referred to as a computer-readable storage medium EC2.

The electronic controller circuitry EC is configured to execute at least one control algorithm of the sensor unit 90. For example, the electronic controller circuitry EC is programed to execute at least one control algorithm of the sensor unit 90. The hardware memory EC2 stores at least one program including at least one program instruction. The at least one program is read into the hardware processor EC1, and thereby the at least one control algorithm of the sensor unit 90 is executed based on the at least one program. The electronic controller circuitry EC can also be referred to as an electronic hardware controller circuit or circuitry EC.

As seen in FIG. 9, the first measurement circuit 100 is electrically connected to the electronic controller circuitry EC. The first measurement circuit 100 is electrically mounted on the circuit board EC3 of the electronic controller circuitry EC. For example, the first measurement circuit 100 is electrically connected to the first strain gauge 96 via the circuit board EC3 and the system bus EC4. The electronic controller circuitry EC is electrically connected to the first measurement circuit 100 to receive the first voltage indicating the deformation amount of the first portion 80 from the first measurement circuit 100. The electronic controller circuitry EC is configured to calculate the first force F1 based on the first voltage received from the first measurement circuit 100 of the first sensor 92.

The second measurement circuit 102 is electrically connected to the electronic controller circuitry EC. The second measurement circuit 102 is electrically mounted on the circuit board EC3 of the electronic controller circuitry EC. For example, the second measurement circuit 102 is electrically connected to the second strain gauge 98 via the circuit board EC3 and the system bus EC4. The electronic controller circuitry EC is electrically connected to the second measurement circuit 102 to receive the second voltage indicating the deformation amount of the second portion 82 from the second measurement circuit 102. The electronic controller circuitry EC is configured to calculate the second force F2 based on the second voltage received from the second measurement circuit 102 of the second sensor 94.

As seen in FIG. 9, the electronic controller circuitry EC includes a wireless communicator WC. The wireless communicator WC is configured to wirelessly communicate with an additional wireless communicator of an additional electric device. Examples of the additional electric device include a gear changer, an adjustable seatpost, a suspension, an assist drive unit, a cycle computer, a smartphone, and a tablet computer.

The wireless communicator WC is electrically connected to the hardware processor EC1 and the hardware memory EC2 with the circuit board EC3 and the system bus EC4. The wireless communicator WC includes a signal transmitting circuit or circuitry, a signal receiving circuit or circuitry, and an antenna. Thus, the wireless communicator WC can also be referred to as a wireless communicator circuit or circuitry WC.

The wireless communicator WC is configured to superimpose digital signals on carrier wave using a predetermined wireless communication protocol to wirelessly transmit signals. In the first embodiment, the wireless communicator WC is configured to encrypt signals using a cryptographic key to generate encrypted wireless signals. The wireless communicator WC is configured to transmit wireless signals via the antenna.

The wireless communicator WC is configured to receive wireless signals via the antenna. In the first embodiment, the wireless communicator WC is configured to decode the wireless signals to recognize signals transmitted from other wireless communicators. The wireless communicator WC is configured to decrypt the wireless signals using the cryptographic key.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, the wireless communicator WC is configured to at least receive a wireless signal. For example, the wireless communicator WC is a two-way wireless transceiver that conducts two-way wireless communications using the wireless receiver for wirelessly receiving shift signals and a wireless transmitter for wirelessly transmitting data. The wireless control signals of each of the wireless communicator WC and the wireless communicator WC can be radio frequency (RF) signals, ultra-wide band communication signals, radio frequency identification (RFID), Wi-Fi (registered trademark), Zigbee (registered trademark), ANT+(registered trademark) communications, or Bluetooth (registered trademark) communications or any other type of signal suitable for short range wireless communications as understood in the bicycle field. It should also be understood that each of the wireless communicator WC can transmit the signals at a particular frequency or with an identifier such as a particular code, to distinguish the wireless control signal from other wireless control signals. In this way, the sensor unit 90 can recognize which control signals are to be acted upon and which control signals are not to be acted upon. Thus, the sensor unit 90 can ignore the control signals from other wireless communicators of other electric devices.

The structure of the electronic controller circuitry EC is not limited to the above structure. The structure of the electronic controller circuitry EC is not limited to the hardware processor EC1 and the hardware memory EC2. The electronic controller circuitry EC can be realized by hardware alone or a combination of hardware and software. In the present embodiment, the hardware processor EC1 and the hardware memory EC2 are integrated as a single chip such as an application specific integrated circuit (ASIC) or a field programmable gate array (FPGA). However, the hardware processor EC1 and the hardware memory EC2 can be separate chips if needed or desired. The electronic controller circuitry EC can be at least two electronic controllers which are separately provided. The at least one control algorithm of the sensor unit 90 can be executed by the at least two electronic controllers if needed or desired. The electronic controller circuitry EC can include at least two hardware processors which are separately provided. The electronic controller circuitry EC can include at least two hardware memories which are separately provided. The at least one control algorithm of the sensor unit 90 can be executed by the at least two hardware processors if needed or desired. The at least one control algorithm of the sensor unit 90 can be stored in the at least two hardware memories if needed or desired. The electronic controller circuitry EC can include at least two circuit boards which are separately provided if needed or desired. The electronic controller circuitry EC can include at least two system buses which are separately provided if needed or desired. The circuit board EC3 can include a printed circuit board or a flexible printed circuit. The circuit board EC3 can also be referred to as a substrate EC3.

As seen in FIG. 9, the rotary device 10 includes an electric power source PS. The electric power source PS is electrically connected to the electronic controller circuitry EC to supply electricity to the electronic controller circuitry EC. The electric power source PS includes a battery PS1 and a battery holder PS2. The battery holder PS2 is electrically connected to the electronic controller circuitry EC. The battery holder PS2 is electrically mounted on the circuit board EC3. The battery holder PS2 is configured to detachably and reattachably hold the battery PS1. Examples of the battery PS1 include a primary battery and a secondary battery. Examples of the battery PS1 include a coin-cell battery.

As seen in FIG. 6, the electronic controller circuitry EC is at least partially provided in the first internal space 18S. In the present embodiment, the electronic controller circuitry EC is entirely provided in the first internal space 18S. However, the electronic controller circuitry EC can be partially provided in the first internal space 18S if needed or desired.

The deformation amount of the first extending part 18 basically depends on the input torque T1. However, the change in temperature of the first extending part 18 affects the deformation amount of the first extending part 18. For example, the higher temperature of the first extending part 18 leads thermal expansion of the first extending part 18. The lower temperature of the first extending part 18 leads thermal shrinkage of the first extending part 18. Thus, the change in temperature affects the deformation amount sensed by the sensor unit 90.

With the sensor unit 90, however, it is possible to reduce or eliminate the impact of the change in temperature on the deformation amount sensed by the sensor unit 90 using the first sensor 92 and the second sensor 94. For example, friction generated between the friction member 16 of the radially outer part 12 and brake pads of the disc brake caliper increases the temperature of the rotary device 10. The friction increases the temperature of the radially outer part 12, the first extending part 18, the second extending part 28, the third extending part 38, the fourth extending part 48, the fifth extending part 58, the sixth extending part 68, and the radially inner part 14. For example, the first extending part 18 entirely thermally expands in response to the increase in temperature of the first extending part 18. The first extending part 18 expands radially outwardly in response to the increase in temperature of the first extending part 18. As with the first extending part 18, each of the second extending part 28, the third extending part 38, the fourth extending part 48, the fifth extending part 58, and the sixth extending part 68 entirely thermally expands in response to the increase in temperature.

As seen in FIG. 9, for example, the first information V1 sensed by the first sensor 92 includes a first torque component $V_{1T}$ and a first thermal component $V_{1H}$. The first torque component $V_{1T}$ corresponds to a deformation amount of the first portion 30 caused by the input torque T1. The first thermal component VIII corresponds to a deformation amount of the first portion 30 caused by the change in temperature of the rotary device 10. The first thermal component Viii corresponds to a deformation amount of the first portion 30 caused by thermal expansion or thermal shrinkage of the first extending part 18.

The second information V2 sensed by the second sensor 94 includes a second torque component $V_{2T}$ and a second thermal component $V_{2H}$. The second torque component $V_{2T}$ corresponds to a deformation amount of the second portion 32 caused by the input torque T1. The second thermal component $V_{2H}$ corresponds to a deformation amount of the second portion 32 caused by the change in temperature of the rotary device 10. The second thermal component $V_{2H}$ corresponds to a deformation amount of the second portion 32 caused by thermal expansion or thermal shrinkage of the first extending part 18.

An absolute value of the second torque component $V_{2T}$ is substantially equal to an absolute value of the first torque component $V_{1T}$. However, the first information V1 relates to the amount of compression while the second information V2 relates to the amount of extension. Thus, a sign of the second torque component $V_{2T}$ is different from a sign of the first torque component $V_{1T}$. For example, the first torque component $V_{1T}$ is one of a positive value and a negative value while the second torque component $V_{2T}$ is the other of the positive value and the negative value.

Furthermore, the second thermal component $V_{2H}$ is substantially equal to the first thermal component $V_{1H}$. A sign of the second thermal component $V_{2H}$ is the same as a sign of the first thermal component $V_{1H}$ since the first portion 80 and the second portion 82 are thermally deformed in the same direction. Namely, the following relational equations (1) and (2) are satisfied.

$$V_{1T} \doteq -V_{2T} \quad (1)$$

$$V_{1H} \doteq V_{2H} \quad (2)$$

By using the equations (1) and (2) and the following equation (3), it is possible to reduce or eliminate the impact of the first thermal component $V_{1H}$ and the second thermal component $V_{2H}$ on the input torque T1 calculated by the electronic controller circuitry EC. The electronic controller circuitry EC is configured to calculate third information V3 corresponding to a torque component of the deformation amount based on the equations (1), (2), and (3).

$$V3 = (V1 - V2)/2 = ((V_{1T} + V_{1H}) - (V_{2T} + V_{2H}))/2 \doteq V_{1T} \quad (3)$$

The electronic controller circuitry EC is configured to store relationship information between the third information V3 and the input torque T1 in the hardware memory EC2. The electronic controller circuitry EC is configured to calculate the input torque T1 based on the third information V3 and the relationship information.

Figure 10:
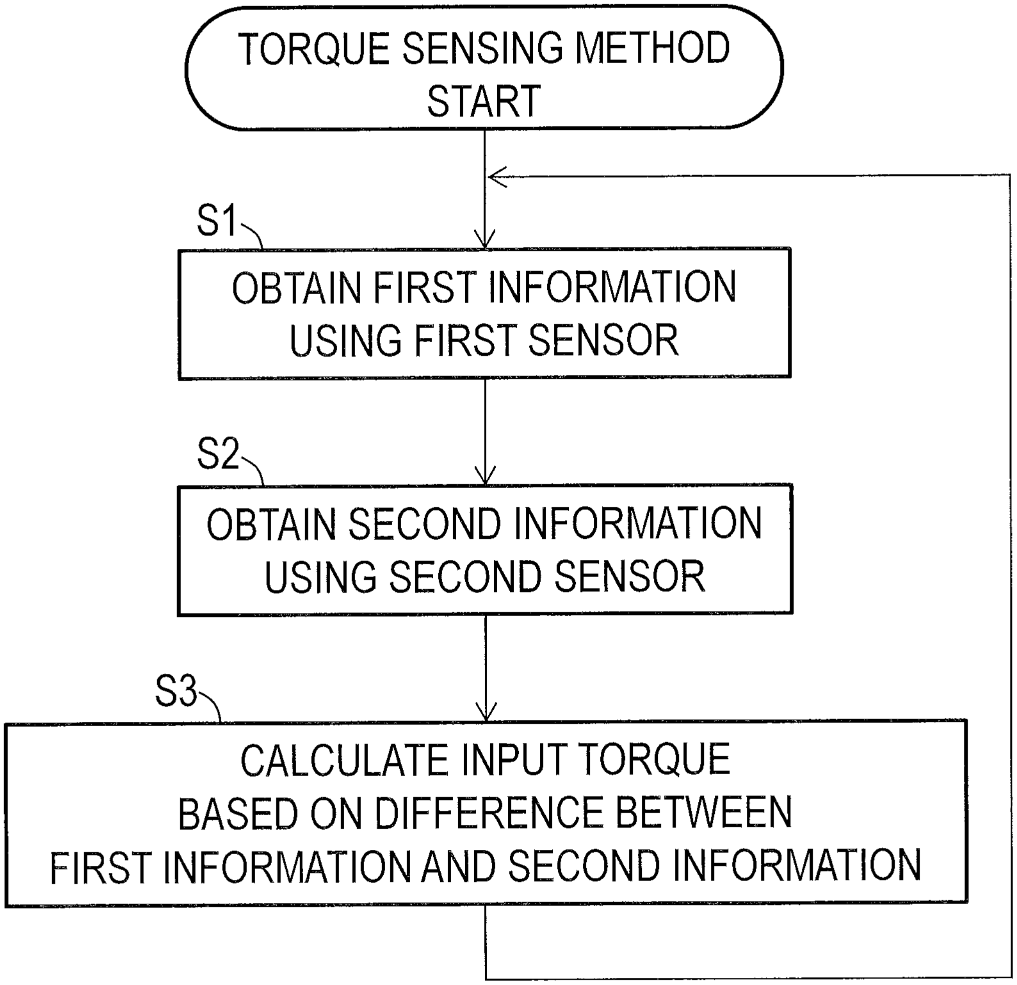
FIG. 10 is a flow chart showing a torque sensing method using the rotary device illustrated in FIG. 1.

As seen in FIG. 10, a torque sensing method in the human-powered vehicle 2 comprises: obtaining the first information relating to the amount of compression in response to input torque T1 using the first sensor 92 (step S1); obtaining the second information relating to the amount of extension in response to the input torque T1 using the second sensor 94 (step S2); and calculating the input torque T1 based on a difference between the first information and the second information (step S3). In the step S3, the third information V3 is calculated by the electronic controller circuitry EC based on the equations (1), (2), and (3). The input torque T1 is calculated by the electronic controller circuitry EC based on the third information V3 and the relationship information. The steps S1 to S3 are repeated at regular intervals in the sensor unit 90. Thus, it is possible to accurately obtain the input torque T1 using the sensor unit 90.

Second Embodiment

A rotary device 210 including a sensor unit 290 in accordance with a second embodiment will be described below referring to FIGS. 11 to 14. The rotary device 210 has the same structure as those of the rotary device 10 except for the arrangement of the second sensor 94. Thus, elements having substantially the same function or structure as those in the first embodiment or the modifications thereof will be numbered the same here and will not be described or illustrated again in detail here for the sake of brevity.

As seen in FIGS. 11 to 14, the rotary device 210 comprises the sensor unit 290. The sensor unit 290 is configured to measure the first force F1 and the second force F2. The sensor unit 290 of the human-powered vehicle 2 comprises the first sensor 92 and the second sensor 94.

Figure 12:
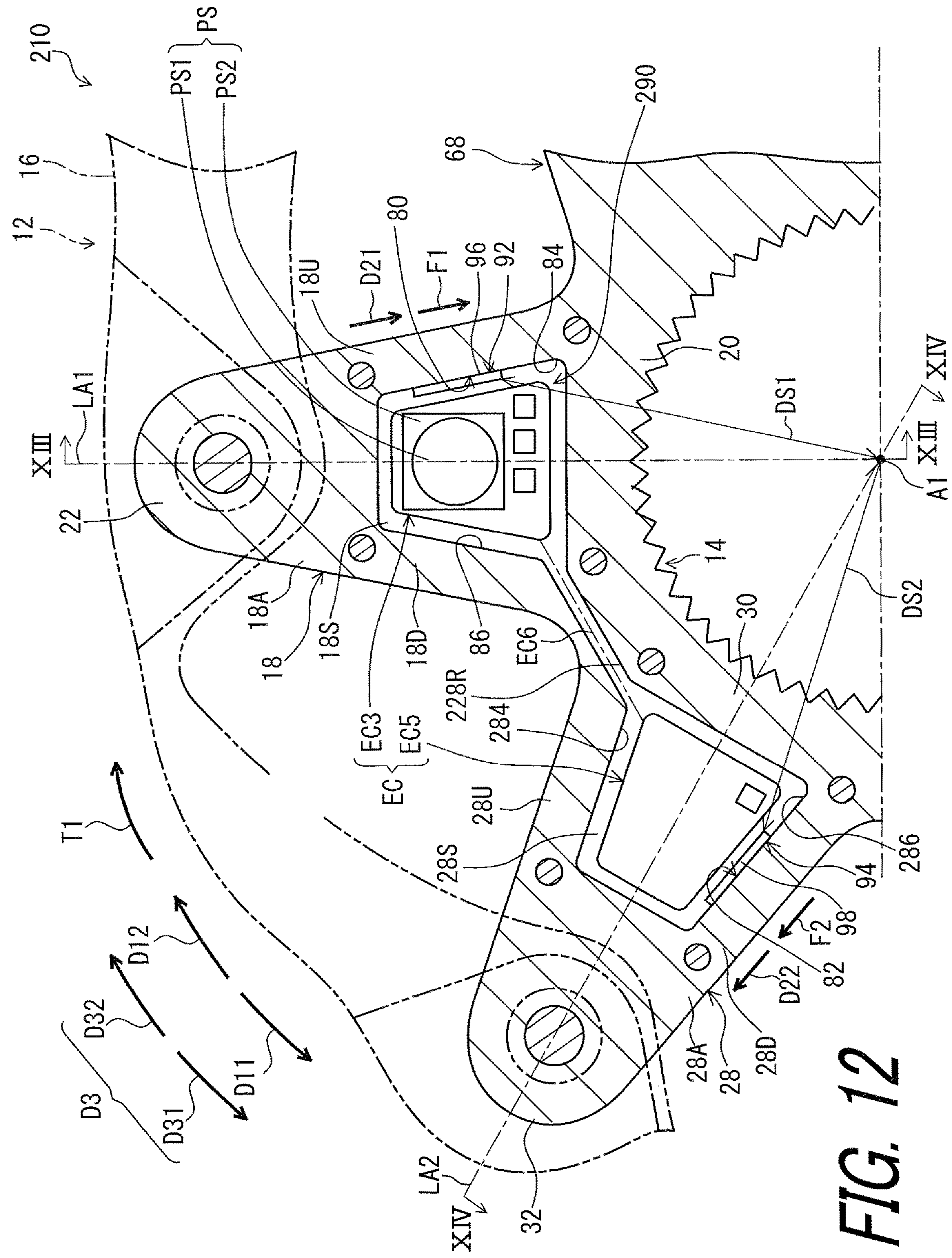
FIG. 12 is a cross-sectional view of the rotary device taken along line XII-XII of FIG. 13.
Figure 13:
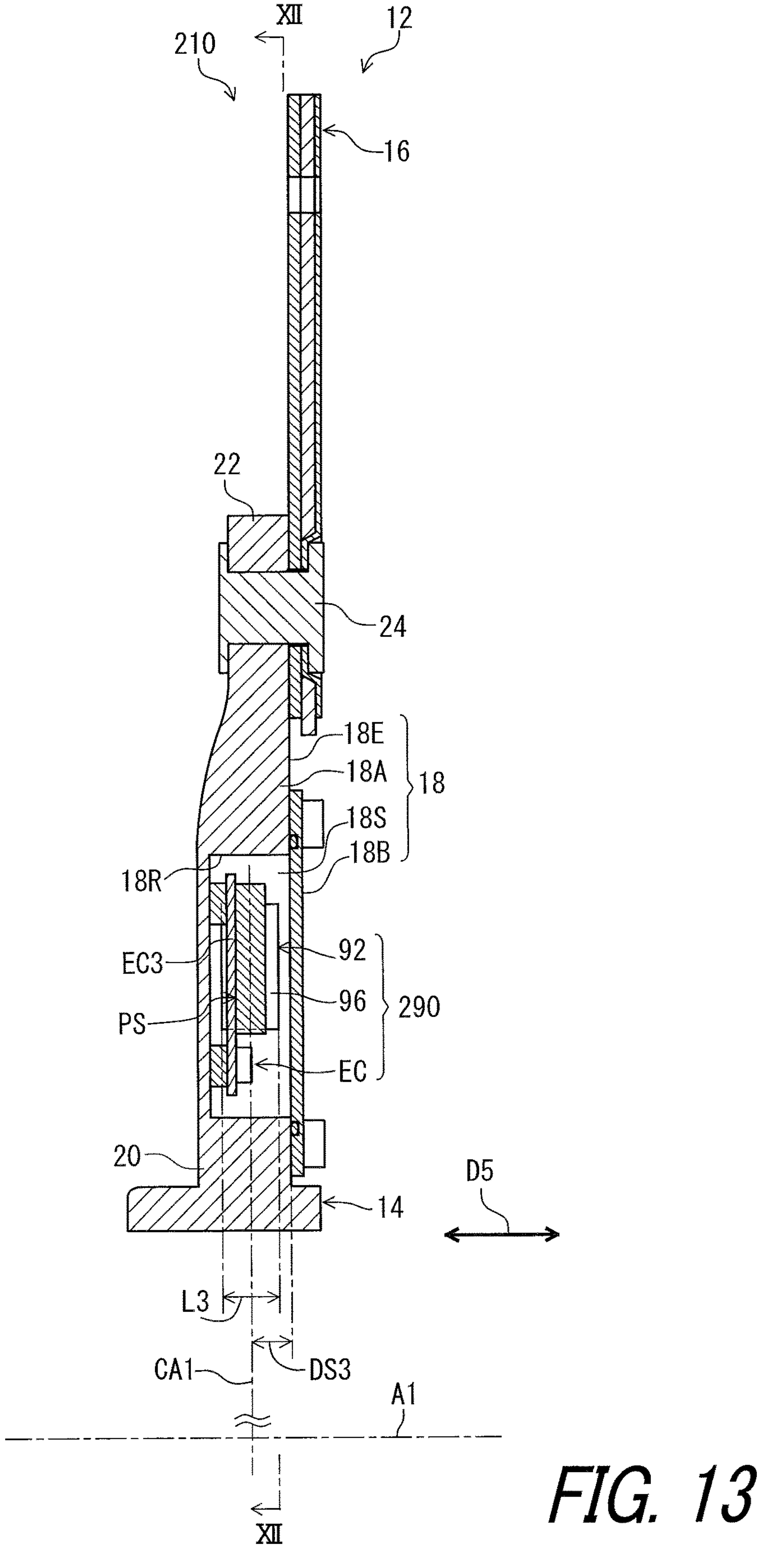
FIG. 13 is a cross-sectional view of the rotary device taken along line XIII-XIII of FIG. 11.

As seen in FIG. 12, the second extending part 28 has a third surface 284 and a fourth surface 286. The third surface 284 faces in the first circumferential direction D31. The fourth surface 286 faces in the second circumferential direction D32. The second extending part 28 includes the second portion 82. The second portion 82 is provided on the fourth surface 286. The first sensor 92 is provided on the first surface 84. The second sensor 94 is provided on the fourth surface 286. Namely, the first sensor 92 is provided to the first extending part 18 while the second sensor 94 is provided to the second extending part 28 different from the first extending part 18.

The second portion 82 is at least partially provided radially between the second radially inner end 30 and the second radially outer end 32. In the present embodiment, the second portion 82 is entirely provided radially between the second radially inner end 30 and the second radially outer end 32. However, the second portion 82 can be partially provided radially between the second radially inner end 30 and the second radially outer end 32 if needed or desired.

Figure 14:
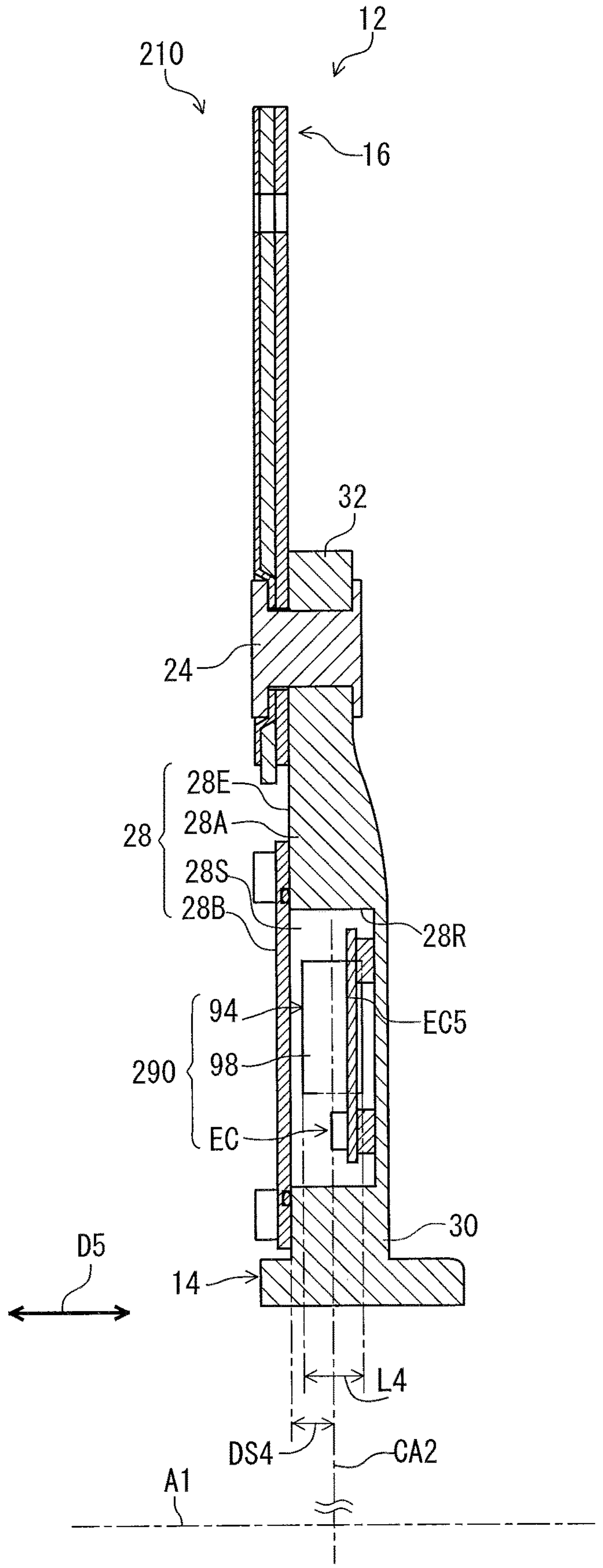
FIG. 14 is a cross-sectional view of the rotary device taken along line XIV-XIV of FIG. 11.

As seen in FIG. 14, the second extending part 28 includes a second base 28A, a second lid 28B, and a second internal space 28S. The second base 28A and the second lid 28B define the second internal space 28S. The second base 28A includes a second recess 28R. The second internal space 28S is defined in the second recess 28R.

Figure 11:
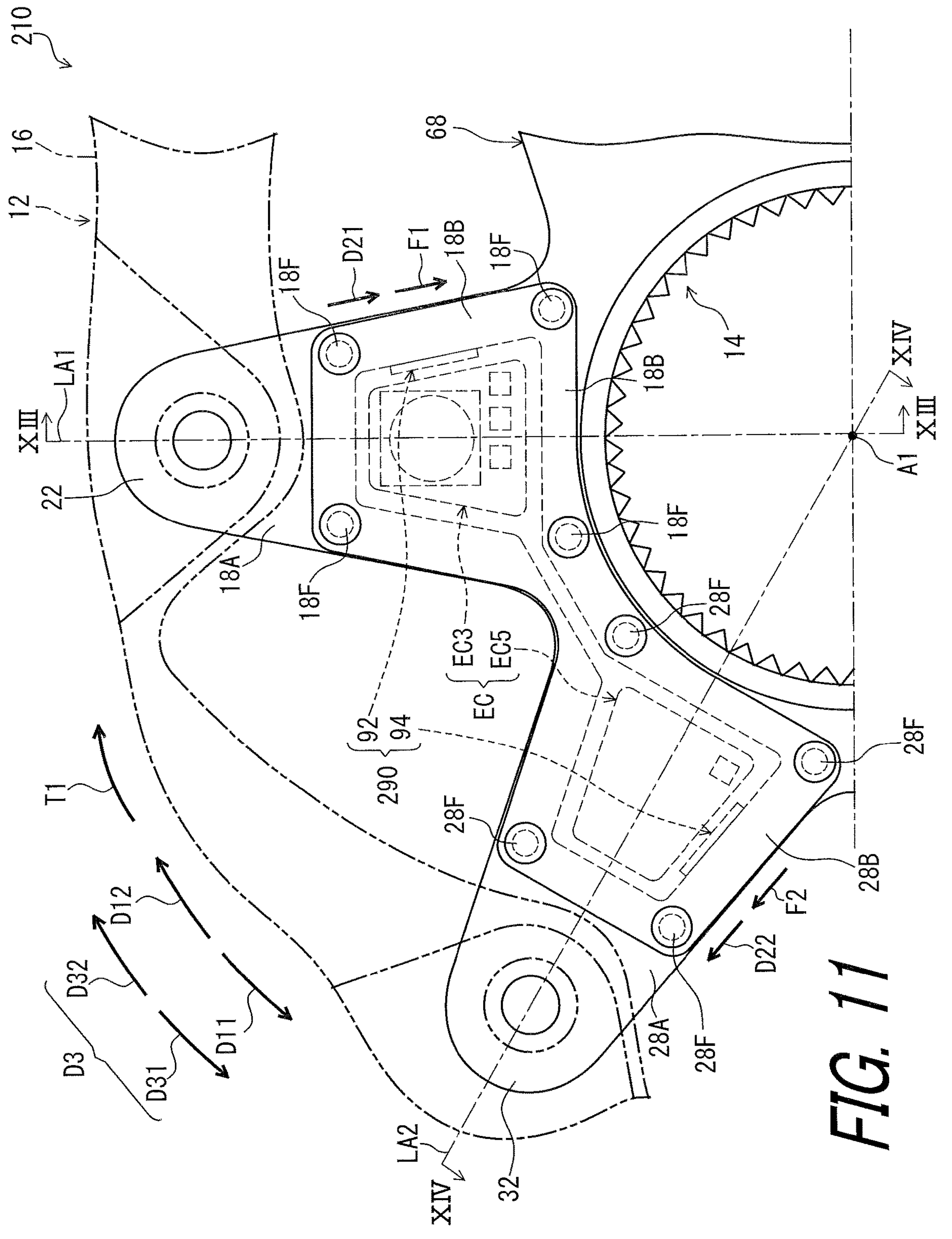
FIG. 11 is a partial side elevational view of a rotary device in accordance with a second embodiment.

As seen in FIG. 11, the second extending part 28 includes at least two second fasteners 28F. The second lid 28B is secured to the second base 28A with the second fasteners 28F. The second lid 28B is at least partially provided radially between the radially outer part 12 and the radially inner part 14 as viewed along the rotational axis A1. In the present embodiment, the second lid 28B is entirely provided between the radially outer part 12 and the radially inner part 14 as viewed along the rotational axis A1. However, the second lid 28B can be partially provided between the radially outer part 12 and the radially inner part 14 as viewed along the rotational axis A1.

In the present embodiment, the second lid 28B is integrally provided with the first lid 18B as a one-piece unitary member. However, the second lid 28B can be a separate member from the first lid 18B if needed or desired.

As seen in FIG. 12, the second extending part 28 includes a second upstream wall 28U and a second downstream wall 28D. The second downstream wall 28D is spaced apart from the second upstream wall 28U in the driving rotational direction D11. The second upstream wall 28U includes the second portion 82 and the third surface 284. The second downstream wall 28D includes the second portion 82 and the fourth surface 286. The second internal space 28S is provided between the second upstream wall 28U and the second downstream wall 28D. The second sensor 94 is provided in the second internal space 28S.

The electronic controller circuitry EC includes an additional circuit board EC5. The second measurement circuit 102 is electrically mounted on the additional circuit board EC5. The additional circuit board EC5 is provided in the second internal space 28S. The additional circuit board EC5 is electrically connected to the circuit board EC3 via an electric cable EC6. The second internal space 28S is in communication with the first internal space 18S via a connecting space 228R. The electric cable EC6 is provided in the connecting space 228R.

As with the second embodiment, the second sensor 94 and the second portion 82 can be provided to one of the third extending part 38, the fourth extending part 48, the fifth extending part 58, and the sixth extending part 68 if needed or desired.

In each of the first and second embodiments and the modifications thereof, the electronic controller circuitry EC is configured to calculate the difference between the first information V1 and the second information V2 and then to calculate the input torque T1 based on the calculated difference. However, the electronic controller circuitry EC can be configured to calculate the first torque T1 based on the first information V1 and to calculate the second torque T2 based on the second information V2, and then to calculate the difference between the first torque T1 and the second torque T2. In this case, it is possible to reduce or eliminate the impact of the first thermal component $V_{1H}$ and the second thermal component $V_{2H}$ on the input torque T1 calculated by the electronic controller circuitry EC.

Figure 15:
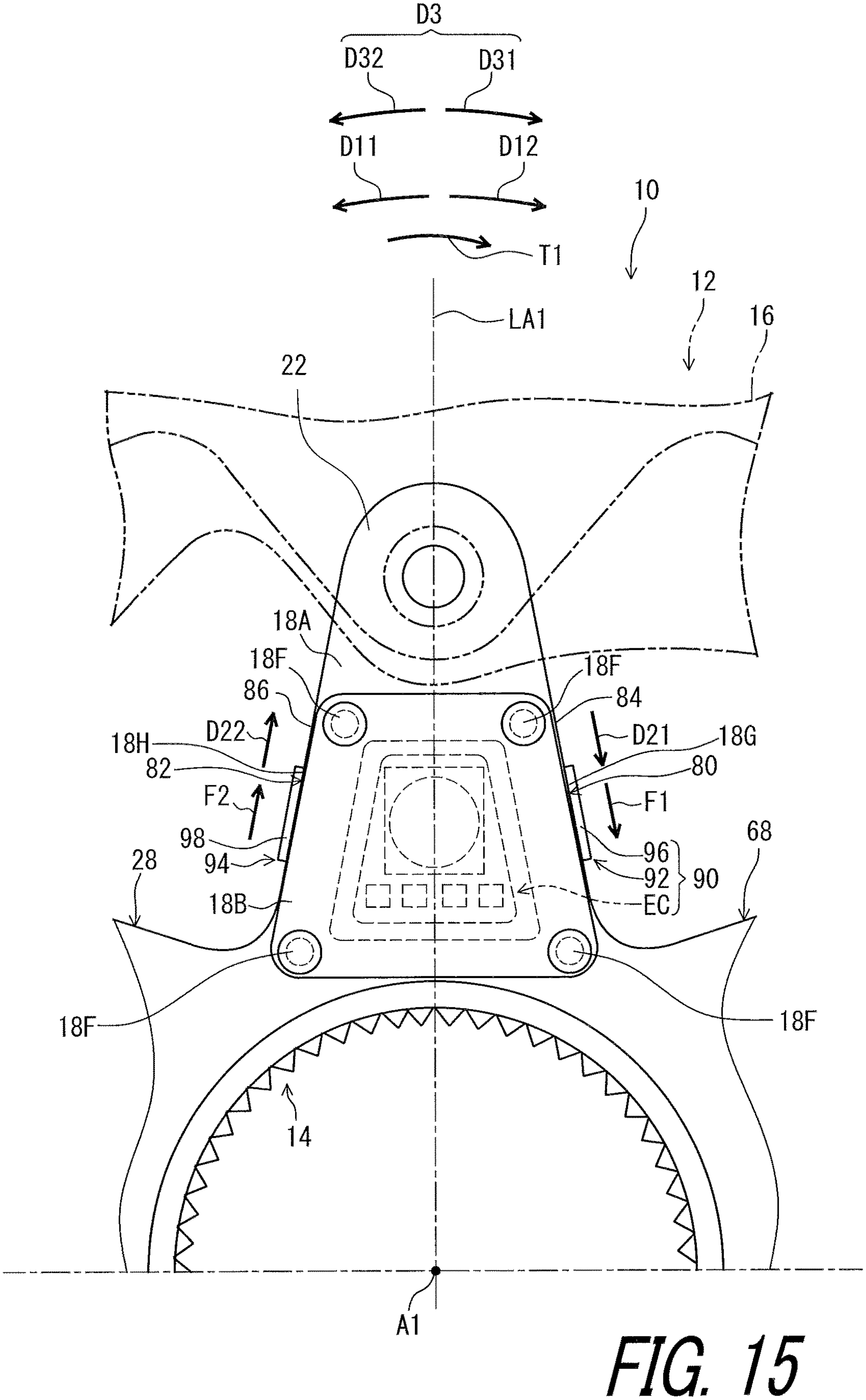
FIG. 15 is a partial side elevational view of a rotary device in accordance with a modification.

In each of the first embodiment and the modifications thereof, the sensor unit 90 is entirely provided in the first internal space 18S. However, the sensor unit 90 can be at least partially provided outside the first internal space 18S if needed or desired. As seen in FIG. 15, for example, the sensor unit 90 can provided on an outer surface of the first extending part 18. The sensor unit 90 can be provided on an outer surface of the first extending part 18. The first surface 84 is provided outside the first extending part 18. The second surface 86 is provided outside the second extending part 28. The first surface 84 has a first outer surface 18G. The second surface 86 has a second outer surface 18H. The first outer surface 18G faces in the first circumferential direction D31. The second outer surface 18H faces in the second circumferential direction D32. The first portion 80 can be provided to the first outer surface 18G of the first extending part 18, and the second portion 82 can be provided to the second outer surface 18H of the first extending part 18. In this modification, the second circumferential direction D32 is the same direction as the driving rotational direction D11. The arrangement of the sensor unit 90 can be applied to the second embodiment and the modifications thereof.

Figure 17:
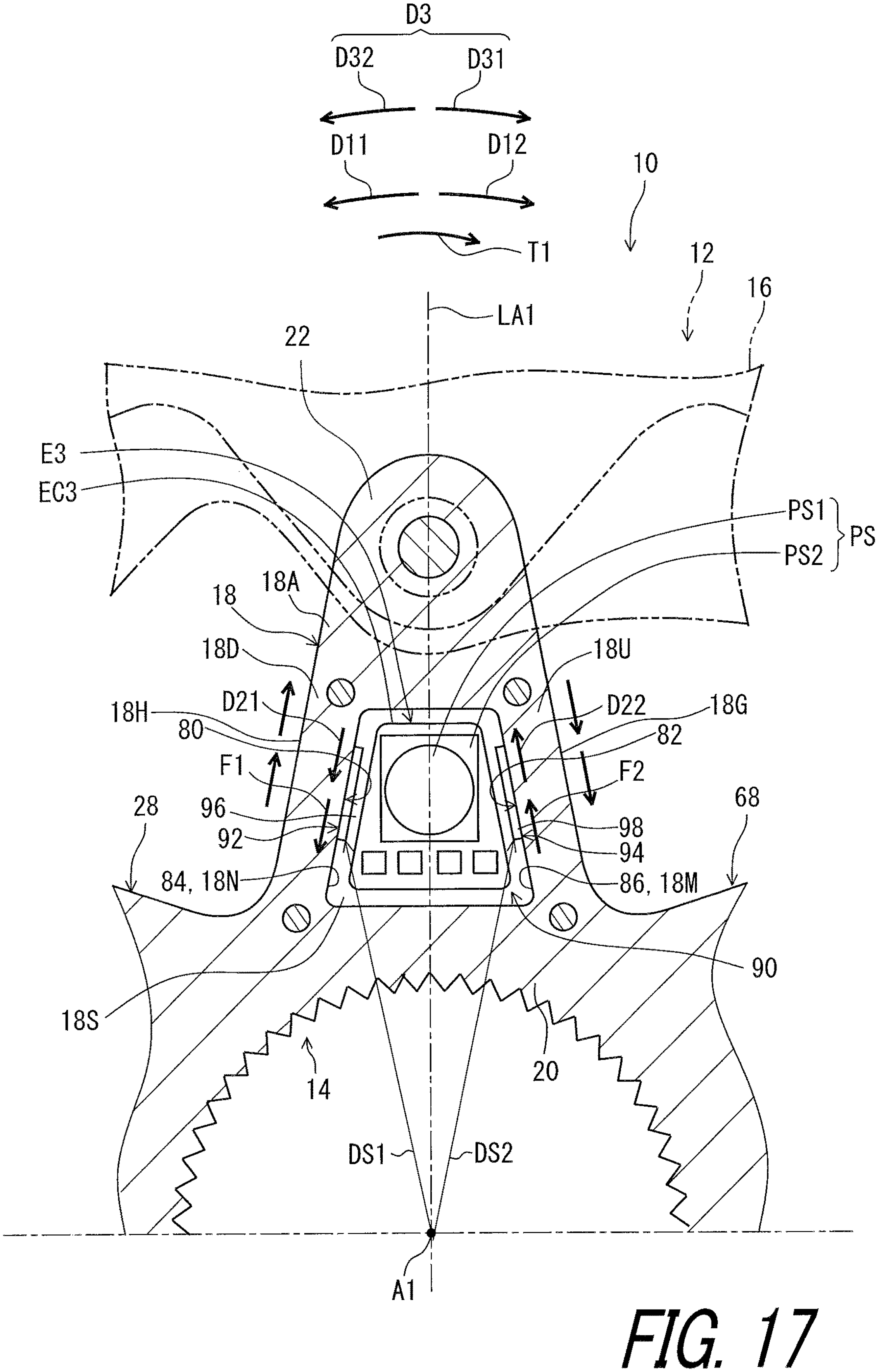
FIG. 17 is a cross-sectional view of a rotary device in accordance with a modification.

In each of the first and second embodiments and the modifications thereof, the relationship between the compression and the extension can be reversed depending on the shapes of the first upstream wall 18U and the first downstream wall 18D, the arrangement of the first sensor 92 and the second sensor 94, the shapes of the first portion 80 and the second portion 82, or the arrangement of the first portion 80 and the second portion 82. As seen in FIG. 17, for example, the first portion 80 and the second portion 82 can be replaced in a case where a first inner surface 18M of the first upstream wall 18U is extended and a second inner surface 18N of the first downstream wall 18D is compressed in response to the input torque T1. In this case, as with each of the first and second embodiments and the modifications thereof, the first outer surface 18G of the first upstream wall 18U is compressed, and the second outer surface 18H of the first downstream wall 18D is extended. The modification depicted in FIG. 17 can be applied to the second embodiment and the modifications thereof.

Figure 16:
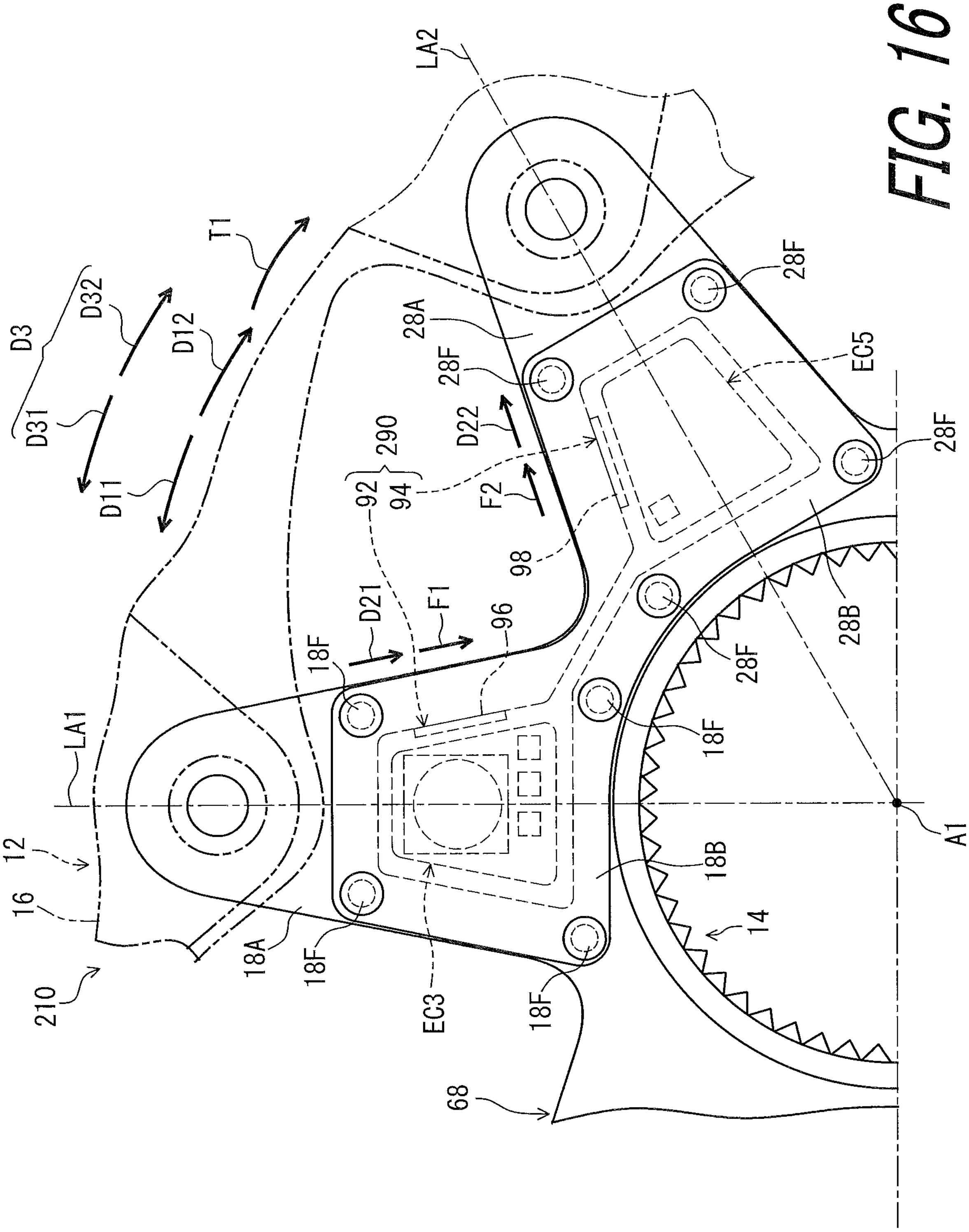
FIG. 16 is a partial side elevational view of a rotary device in accordance with a modification.

In the second embodiment and the modifications thereof, the second extending part 28 is provided on a downstream side of the first extending part 18 in the driving rotational direction D11. As seen in FIG. 16, however, the second extending part 28 can be provided on an upstream side of the first extending part 18 in the driving rotational direction D11 if needed or desired.

In each of the first and second embodiments and the modifications thereof, the electronic controller circuitry EC includes the wireless communicator WC. However, the electronic controller circuitry EC can include a wired communicator instead of or in addition to the wireless communicator WC if needed or desired. The wired communicator is configured to communicate with an additional wired communicator via an electric cable.

In each of the first and second embodiments and the modifications thereof, the rotary device 10 or 210 includes the electric power source PS. However, the rotary device 10 can be powered by an electric power source provided remotely from the rotary device 10 if needed or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rotary device comprising:

a first extending part extending radially along a first longitudinal center axis thereof with respect to a rotational axis of the rotary device, the first extending part including:

a first portion configured to receive a first force in a compression direction in response to input torque;

a second portion configured to receive a second force in an extension direction in response to the input torque; and a first recess provided between the first portion and the second portion, the first longitudinal center axis extending through the recess; and a sensor unit configured to measure the first force and the second force, wherein the sensor unit includes a first sensor, the first portion is provided on a first surface, the first surface faces in a first circumferential direction toward the first longitudinal center axis, and the first sensor is at least partially provided on the first surface.

2. The rotary device according to claim 1, wherein the sensor unit includes a second sensor, and the second sensor is at least partially provided to the second portion.

3. The rotary device according to claim 2, wherein the first sensor includes a first strain gauge at least partially provided to the first portion, and the second sensor includes a second strain gauge at least partially provided to the second portion.

4. The rotary device according to claim 1, wherein the first portion is configured to be compressed in response to the first force, and the second portion is configured to be extended in response to the second force.

5. The rotary device according to claim 1, wherein the first extending part includes a second surface, the second surface faces in a second circumferential direction, the first circumferential direction is opposite to the second circumferential direction, and each of the first surface and the second surface extends axially with respect to the rotational axis.

6. The rotary device according to claim 5, wherein the sensor unit includes a second sensor, the second portion is provided on the second surface, the second surface faces in the second circumferential direction toward the first longitudinal center axis, and the second sensor is at least partially provided on the second surface.

7. The rotary device according to claim 5, further comprising:

a second extending part extending radially along a second longitudinal center axis thereof with respect to the rotational axis of the rotary device, the second extending part including:

a third portion configured to receive a third force in the compression direction in response to input torque;

a fourth portion configured to receive a fourth force in the extension direction in response to the input torque; and a second recess provided between the third portion and the fourth portion, the second longitudinal center axis extending through the second recess.

8. The rotary device according to claim 7, wherein the second extending part includes a third surface and a fourth surface, the third surface faces in the first circumferential direction toward the second longitudinal center axis, the fourth surface faces in the second circumferential direction toward the second longitudinal center axis, the sensor unit includes a second sensor, and the second sensor is at least partially provided on the fourth surface.

9. The rotary device according to claim 5, wherein the first extending part includes a first radially inner end and a first radially outer end, the first extending part extends radially outwardly from the first radially inner end to the first radially outer end, and the first portion is at least partially provided radially between the first radially inner end and the first radially outer end.

10. The rotary device according to claim 5, wherein the first extending part has a symmetrical shape with respect to the first longitudinal center axis as viewed along the rotational axis.

11. The rotary device according to claim 5, further comprising a second extending part extending radially with respect to the rotational axis, the second extending part having a third surface and a fourth surface, the third surface facing in the first circumferential direction, the fourth surface facing in the second circumferential direction, wherein the second extending part includes the second portion, and the second portion is provided on the fourth surface.

12. The rotary device according to claim 11, wherein the first sensor is provided on the first surface, and the second sensor is provided on the fourth surface.

13. The rotary device according to claim 11, wherein the second extending part includes a second radially inner end and a second radially outer end, the second extending part extends radially outwardly from the second radially inner end to the second radially outer end, and the second portion is at least partially provided radially between the second radially inner end and the second radially outer end.

14. The rotary device according to claim 11, wherein the second extending part has a second longitudinal center axis and extends along the second longitudinal center axis, and the second extending part has a symmetrical shape with respect to the second longitudinal center axis as viewed along the rotational axis.

15. The rotary device according to claim 11, wherein the second extending part is circumferentially adjacent to the first extending part without another extending part between the first extending part and the second extending part.

16. The rotary device according to claim 11, wherein the first extending part has a first shape as viewed along the rotational axis, the second extending part has a second shape as viewed along the rotational axis, and the second shape is identical to the first shape.

17. The rotary device according to claim 5, further comprising:

a radially outer part extending circumferentially about the rotational axis; and a radially inner part provided radially inwardly of the radially outer part, wherein the first extending part extends radially between the radially outer part and the radially inner part.

18. The rotary device according to claim 17, wherein the first extending part is at least partially provided integrally with the radially inner part as a one-piece unitary member.

19. The rotary device according to claim 17, wherein the radially outer part includes a friction member.

20. The rotary device according to claim 1, wherein a first radial distance is defined from the rotational axis to the first sensor, a second radial distance is defined from the rotational axis to a second sensor of the sensor unit, and the first radial distance is equal to the second radial distance.

21. The rotary device according to claim 1, wherein the sensor unit includes electronic controller circuitry, and the electronic controller circuitry is configured to obtain torque applied to the rotary device based on a difference between the first force and the second force.

22. A rotary device comprising:

a first extending part extending radially along a first longitudinal center axis thereof with respect to a rotational axis of the rotary device, the first extending part including:

a first portion configured to receive a first force in a compression direction in response to input torque;

a second portion configured to receive a second force in an extension direction in response to the input torque; and a recess provided between the first portion and the second portion; and a sensor unit including a first sensor configured to measure the first force and a second sensor configured to measure the second force, wherein the rotary device includes a disc brake rotor, the first sensor and the second sensor are provided on different surfaces within the recess, and the first sensor and the second sensor are arranged symmetrically with respect to the first longitudinal center axis.

* * * * *